(12) United States Patent  (10) Patent No.: US 8,532,576 B2
Kawamura et al.  (45) Date of Patent: Sep. 10, 2013

(54) SYSTEM FOR CONTROLLING WIRELESS COMMUNICATION BETWEEN PORTABLE DEVICE AND COMMUNICATION CONTROLLER

(75) Inventors: Daisuke Kawamura, Aichi (JP); Yoshiyuki Mizuno, Aichi (JP); Hidenobu Hanaki, Aichi (JP); Hiroaki Iwashita, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 962 days.

(21) Appl. No.: 12/061,277

(22) Filed: Apr. 2, 2008

(65) Prior Publication Data

US 2008/0287067 A1  Nov. 20, 2008

(30) Foreign Application Priority Data

Apr. 5, 2007  (JP) .................. 2007-099557

(51) Int. Cl.
*H04B 1/00*  (2006.01)
(52) U.S. Cl.
USPC .............. 455/63.1; 455/414.1; 455/556.1; 455/67.11; 340/426.19; 340/539.26; 340/576; 340/988; 701/2
(58) Field of Classification Search
USPC ... 455/414.1, 521, 556.1, 67.11; 340/426.19, 340/5.61, 539.26, 576, 988; 701/2
See application file for complete search history.

(56) References Cited

U.S. PATENT DOCUMENTS

| | | | |
|---|---|---|---|
| 6,093,980 A | 7/2000 | Yamamoto et al. | |
| 6,801,134 B1 * | 10/2004 | Juzswik | 340/12.51 |
| 6,958,675 B2 * | 10/2005 | Maeda et al. | 340/5.61 |
| 7,050,587 B1 * | 5/2006 | Berberich | 380/262 |
| 7,187,292 B2 * | 3/2007 | Hayashi et al. | 340/576 |
| 7,199,710 B2 * | 4/2007 | Hiramitsu et al. | 340/539.26 |
| 7,383,056 B2 * | 6/2008 | Matsubara et al. | 455/521 |
| 7,526,279 B1 * | 4/2009 | Fujisaki | 455/414.1 |
| 7,532,879 B1 * | 5/2009 | Fujisaki | 455/414.1 |
| 7,613,551 B2 * | 11/2009 | Watanabe et al. | 701/2 |
| 7,663,508 B2 * | 2/2010 | Teshima et al. | 340/988 |
| 7,778,664 B1 * | 8/2010 | Fujisaki | 455/556.1 |
| 2002/0070845 A1 * | 6/2002 | Reisinger et al. | 340/5.61 |
| 2002/0105411 A1 * | 8/2002 | Maeda et al. | 340/5.64 |
| 2003/0162528 A1 * | 8/2003 | Juzswik | 455/411 |
| 2005/0052276 A1 * | 3/2005 | Kumazaki et al. | 340/5.61 |
| 2006/0012462 A1 * | 1/2006 | Teshima et al. | 340/5.61 |

(Continued)

FOREIGN PATENT DOCUMENTS

DE  199 23 983 A1  12/2000
DE  199 41 346 A1  3/2001

(Continued)

*Primary Examiner* — April G Gonzales
(74) *Attorney, Agent, or Firm* — Patterson Thuente Pedersen, P.A.

(57) ABSTRACT

A portable device for preventing communication errors caused by disturbance such as noise. The portable device receives a first request signal from a communication controller and transmits a first response signal corresponding to the first request signal. A transmitter transmits the first response signal with a selected one of a plurality of frequencies. A transmission control unit transmits the first response signal from the transmitter with the one of the plurality of frequencies. The portable device further receives a second request signal from the communication control unit, which receives the first response signal. When the second request signal cannot be received, the portable device retransmits the first response signal from the transmitter with a frequency that differs from the one of the plurality of frequencies.

14 Claims, 18 Drawing Sheets

(56) References Cited

U.S. PATENT DOCUMENTS

| | | | |
|---|---|---|---|
| 2007/0099575 A1* | 5/2007 | Nagai | 455/67.11 |
| 2007/0201503 A1* | 8/2007 | Nishio | 370/437 |
| 2007/0290819 A1* | 12/2007 | Teshima et al. | 340/426.19 |
| 2008/0169898 A1 | 7/2008 | Kato et al. | |
| 2010/0290404 A1 | 11/2010 | Nishio | |
| 2011/0230237 A1 | 9/2011 | Nishio | |

FOREIGN PATENT DOCUMENTS

| | | |
|---|---|---|
| FR | 2 808 365 A1 | 11/2001 |
| JP | 10-292700 A | 11/1998 |
| JP | 11-011257 A | 1/1999 |
| JP | 2001-152717 A | 6/2001 |
| JP | 2001-311333 | 11/2001 |
| JP | 2002-054331 A | 2/2002 |
| JP | 2002-339612 A | 11/2002 |
| JP | 2002-368654 A | 12/2002 |
| JP | 2003-074237 A | 3/2003 |
| JP | 2004-027490 A | 1/2004 |
| JP | 2004-162521 A | 6/2004 |
| JP | 2005-299305 A | 10/2005 |
| JP | 2005-354356 A | 12/2005 |
| JP | 2006-054860 A | 2/2006 |

* cited by examiner (a)

(b)

(c)

[Unidirectional Communication Processing]

[Bidirectional Communication Processing]

[Bidirectional Communication Processing]

[Bidirectional Communication Processing]

[Bidirectional Communication Processing]

SYSTEM FOR CONTROLLING WIRELESS COMMUNICATION BETWEEN PORTABLE DEVICE AND COMMUNICATION CONTROLLER

CROSS-REFERENCE TO RELATED APPLICATIONS

This application is based upon and claims the benefit of priority from the prior Japanese Patent Application No. 2007-099557, filed on Apr. 5, 2007, the entire contents of which are incorporated herein by reference.

BACKGROUND OF THE INVENTION

The present invention relates to a system for controlling wireless communication between a portable device and a communication controller, and more particularly, to a communication control system for controlling the locking and unlocking of a vehicle door through wireless communication.

Japanese Laid-Open Patent Publication No. 2001-311333 describes a vehicle communication control system that remotely controls security equipment through wireless communication. The vehicle communication control system controls wireless communication performed between a portable device, which is held by a vehicle user, and a communication controller, which is installed in a vehicle. The communication automatically locks and unlocks a vehicle door and enables the starting of the engine.

More specifically, the communication controller transmits a request signal to a predetermined area near the vehicle and a predetermined area in the passenger compartment. When receiving the request signal from an associated communication controller, the portable device automatically returns an ID code signal, which contains a predetermined identification (ID) code set for the portable device. Then, the communication controller compares (verifies) the ID code of the ID code signal with a predetermined ID code set for the communication controller. When the two ID codes are the same, the communication controller automatically unlocks the door or enables the starting of the engine.

Disturbance such as noise may be mixed in the ID code signal transmitted from the portable device. This may modify the data of the ID code in the ID code signal. As a result, the communication controller would not be able to recognize the original ID code. Particularly, when noise is cyclically produced such that it is synchronized with the transmission cycle of the ID code signal, communication errors may continuously occur in the communication control system of the prior art. Thus, there is a need to improve the noise resistance in the communication control system of the prior art.

SUMMARY OF THE INVENTION

The present invention provides a portable device, a communication controller, and a communication control system that prevent communication errors, which are caused by disturbance such as noise.

One aspect of the present invention is a portable device for performing wireless communication with a communication controller to receive a first request signal from the communication controller. The portable device includes a transmitter which transmits a first response signal with a selected one of a plurality of frequencies that corresponds to the first request signal in response thereto. A transmission control unit controls a transmission frequency of the transmitter and transmits the first response signal with one of the plurality of frequencies. The portable device is able to receive a second request signal from the communication controller that receives the first response signal. When the portable device does not receive the second request signal, the transmission control unit retransmits the first response signal with another one of the plurality of frequencies.

A further aspect of the present invention is a portable device for performing wireless communication with a communication controller to receive a first request signal from the communication controller. The portable device includes a transmitter which transmits a first response signal with a selected one of a plurality of frequencies that corresponds to the first request signal in response thereto. A transmission control unit controls a transmission frequency of the transmitter and sequentially transmits a plurality of first response signals having different frequencies and corresponding to the first request signal from the transmitter to the communication controller. The communication controller transmits to the portable device a second request signal including frequency data based on the plurality of first response signals. The transmission control unit transmits a second response signal with a frequency indicated by the frequency data in response to the second request signal.

Another aspect of the present invention includes a communication controller for performing wireless communication with a portable device for receiving a first response signal therefrom. The communication controller includes a transmitter which transmits a first request signal to the portable device, in which the portable device responds thereto with the first response signal corresponding to the first request signal. A receiver is able to receive a wireless signal with a selected one of a plurality of frequencies. The wireless signal includes the first response signal. A communication control unit controls transmission of the first request signal, reception of the first response signal, and a reception frequency of the receiver. After transmitting the first request signal, based on a predetermined signal wait time, the communication control unit selectively executes a frequency changing control for changing the reception frequency of the receiver and a second request signal transmission control for transmitting a second request signal to the portable device in response to the first response signal.

Still another aspect of the present invention is a communication controller for performing wireless communication with a portable device and receiving a first response signal therefrom. The communication controller includes a transmitter which transmits a first request signal to the portable device, in which the portable device responds thereto with the first response signal corresponding to the first request signal. A receiver is able to receive a wireless signal with a selected one of a plurality of frequencies. The wireless signal includes the first response signal. A communication control unit controls transmission of the first request signal, reception of the first response signal, and a reception frequency of the receiver. The communication control unit is configured to sequentially receive a plurality of first response signals corresponding to the first request signal with different frequencies and transmit a second request signal to the portable device. The communication control unit compares the frequencies of the plurality of first response signals to select an optimal frequency. Further, the communication control unit includes frequency data indicating the selected optimal frequency in the second request signal to receive a second response signal corresponding to the second request signal with the selected optimal frequency.

Yet another aspect of the present invention is a communication control system including a communication controller which transmits a first request signal and a portable device which performs wireless communication with the communication controller and transmits a first response signal that corresponds to the first request signal. A transmitter included in the portable device transmits the first response signal with a selected one of a plurality of frequencies. A transmission control unit included in the portable device controls a transmission frequency of the transmitter and transmits the first response signal from the transmitter with the one of a plurality of frequencies. The portable device is able to receive a second request signal from the communication controller that receives the first response signal. When the portable device does not receive the second request signal, the transmission control unit retransmits the first response signal from the transmitter with a frequency that differs from the one of a plurality of frequencies. A receiver included in the communication controller is able to receive a wireless signal with the selected one of a plurality of frequencies. The wireless signal includes the first response signal. A communication control unit included in the communication control unit controls transmission of the first request signal, reception of the first response signal, and a reception frequency of the receiver. After transmitting the first request signal, based on a predetermined signal wait time, the communication control unit selectively executes a frequency changing control for changing the reception frequency of the receiver and a second request signal transmission control for transmitting the second request signal to the portable device in response to the first response signal. The transmission frequency of the transmitter in the portable device and the reception frequency of the receiver in the communication controller are synchronously changed to the same frequency.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
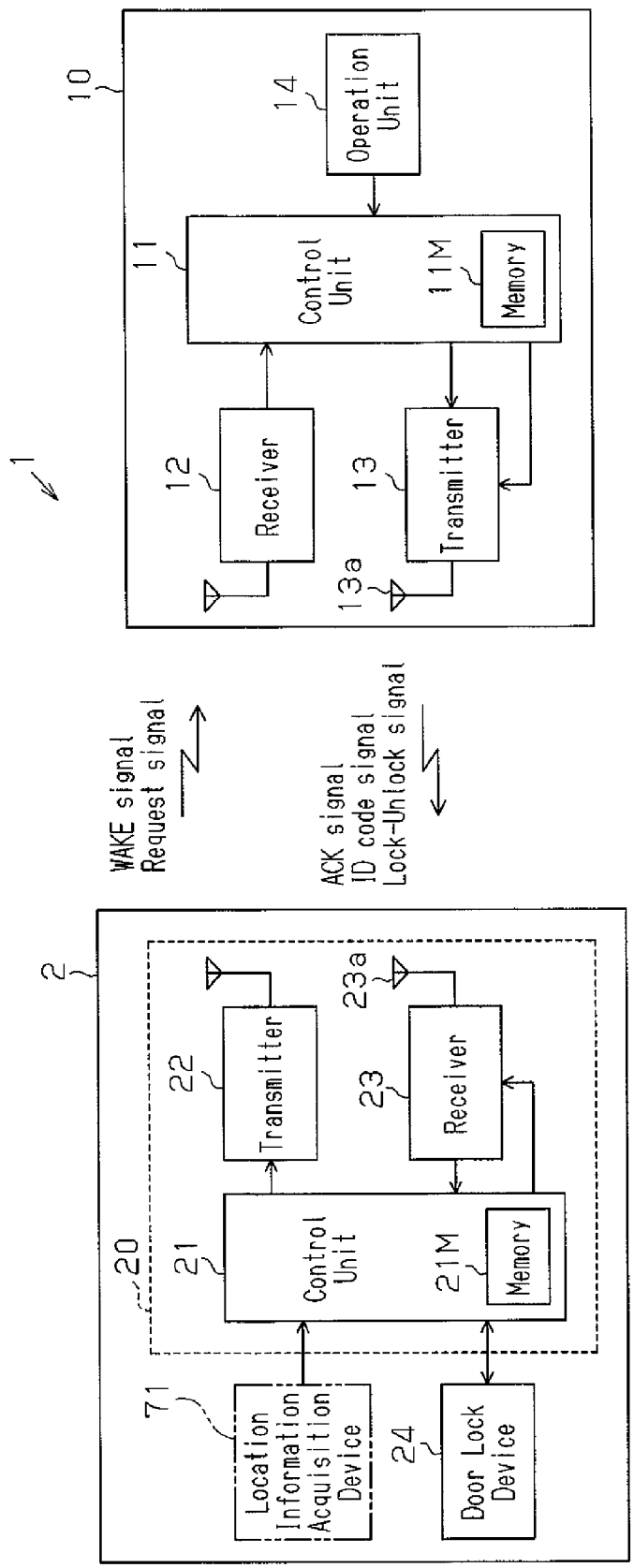
FIG. 1 is a schematic block diagram of a communication control system according to a first embodiment of the present invention and including a portable device and a communication controller.

In the drawings, like numerals are used for like elements throughout.

First Embodiment

A vehicle communication control system 1 according to a first embodiment of the present invention will now be described in detail with reference to FIGS. 1 to 8.

As shown in FIG. 1, the vehicle communication control system 1 includes a portable device 10 and a communication controller 20. The portable device 10 is held by an owner (user) of a vehicle 2. The communication controller 20 is installed in the vehicle 2.

<Portable Device 10>

The portable device 10 has a wireless communication function and is mutually communicable with the communication controller 20. More specifically, the portable device 10 includes a control unit 11, which is a computer unit including a CPU, ROM, and RAM. A receiver 12 and a transmitter 13 are electrically connected to the control unit 11. An operation unit 14 is arranged on an ornamental surface of the portable device 10 in a manner operable by the user.

The receiver 12 receives various wireless signals (e.g., WAKE and request signals) from the communication controller 20. The receiver 12 further demodulates each wireless signal to a pulse signal and provides it to the control unit 11.

The transmitter 13 modulates a data signal, such as an ID code signal, a lock-unlock signal, or a retransmission signal, to a radio wave having a predetermined frequency and transmits the radio wave from the portable device 10. The transmitter 13, which is capable of modulating a data signal to a radio wave having a frequency selected from a plurality of frequencies, changes the frequency of a transmitted radio wave in accordance with a frequency control signal provided from the control unit 11.

Figure 2:
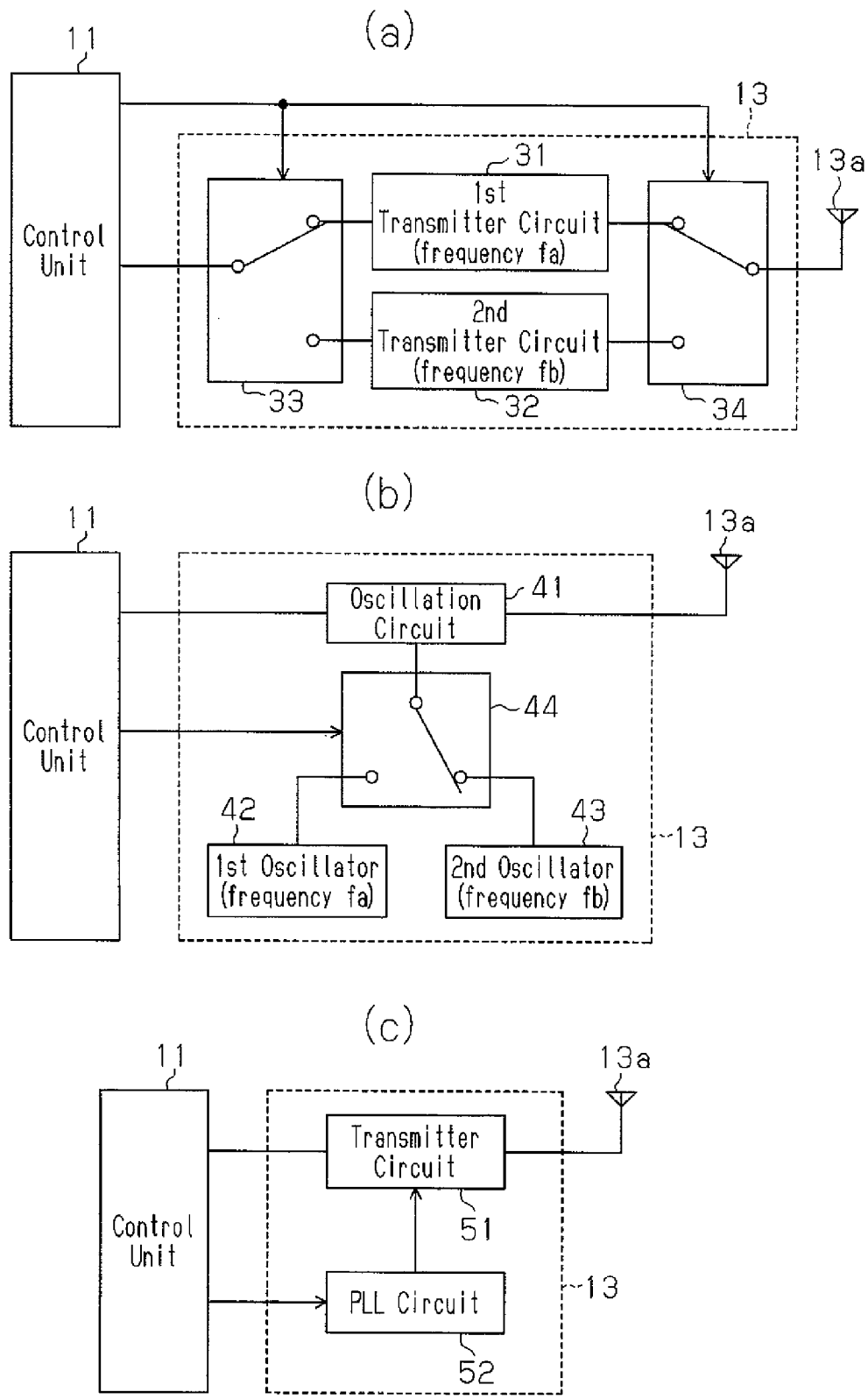
FIGS. 2(a) to 2(c) are block diagrams each showing an example of a transmitter in the portable device of FIG. 1.

More specifically, referring to FIG. 2(*a*), the transmitter 13 includes a plurality of (in this case, two) transmitter circuits (first transmitter circuit 31 and second transmitter circuit 32). A first switch 33 is arranged between the transmitter circuits 31 and 32 and the control unit 11. A second switch 34 is arranged between the transmitter circuits 31 and 32 and a transmitter antenna 13*a*. The first transmitter circuit 31 modulates the data signal provided from the control unit 11 to a signal having a first frequency fa and transmits the modulated signal to the transmitter antenna 13*a*. The second transmitter circuit 32 modulates the data signal provided from the control unit 11 to a signal having a second frequency fb, which differs from the first signal fa, and transmits the modulated signal to the transmitter antenna 13*a*. In this example, the switches 33 and 34, which are each formed by a single pole double throw switch, switch connection states of its contacts in response to a frequency control signal (switch control signal) from the control unit 11. In other words, the control unit 11 switches the connection states of the switches 33 and 34 to select either a connection state of "control unit 11—first transmitter circuit 31 transmitter antenna 13*a*" or a connection state of "control unit 11—second transmitter circuit 32—transmitter antenna 13*a*."

The transmitter 13 is not limited to the structure shown in FIG. 2(*a*) and may have the structure shown in FIG. 2(*b*) or 2(*c*).

The transmitter 13 shown in FIG. 2(*b*) includes an oscillation circuit 41, a plurality of (in this case, two) oscillators 42 and 43 oscillated at different frequencies, and a switch 44 arranged between the oscillation circuit 41 and the oscillators 42 and 43. The first oscillator 42 corresponds to the frequency fa, and the second oscillator 43 corresponds to the frequency fb. In accordance with a frequency control signal (switch control signal), the control unit 11 selects either a connection state of "oscillation circuit 41—first oscillator 42" or a connection state of "oscillation circuit 41—second oscillator 43." Based on the frequency (fa or fb) of the selected oscillator, the oscillation circuit 41 modulates the data signal from the control unit 11 and transmits the modulated signal to the transmitter antenna 13*a*.

The transmitter circuit 13 shown in FIG. 2(*c*) includes a transmitter circuit 51 and a PLL circuit 52, which changes the frequency of a signal transmitted from the transmitter circuit 51. In this case, the control unit 11 determines the output frequency of the PLL circuit 52 in accordance with a frequency control signal. Based on the output frequency of the PLL circuit 52, the transmitter circuit 51 modulates the data signal from the control unit 11 and transmits the modulated signal to the transmitter antenna 13*a*.

The operation unit 14 is formed, for example, by a push button switch. Further, the operation unit 14 includes an unlock switch for performing an unlocking operation and a locking switch for performing a locking operation. When the operation unit 14 is operated, a corresponding operation signal (lock signal or unlock signal) is provided to the control unit 11.

The control unit 11 includes a non-volatile memory 11M, which records a predetermined and unique ID code, a lock code, and an unlock code. When receiving an operation signal from the operation unit 14 or any of various demodulated signals from the receiver 12, the control unit 11 generates a data signal (an ACK, ID code, or lock-unlock signal) corresponding to the input signal. More specifically, the control unit 11 outputs a lock-unlock signal in response to the operation signal from the operation unit 14. Further, the control unit 11 outputs the ACK signal (first response signal) in response to the WAKE signal (first request signal) from the receiver 12. Moreover, the control unit 11 outputs the ID code signal (second response signal) in response to the request signal (second request signal) from the receiver 12. The ACK signal includes a response code corresponding to the WAKE signal. The lock-unlock signal includes the ID code and the lock code or unlock code. The ID code signal includes the ID code.

In accordance with the timing at which a request signal is received by the receiver 12 or how the operation unit 14 is operated, the control unit 11 executes a frequency changing control to change the transmission frequency of the ACK signal, the ID code signal, and the lock-unlock signal. The frequency changing control executed by the control unit 11 will now be described with reference to the flowchart of FIG. 3.

<Processing for Mutual Communication Control>

First, in step S1, the control unit 11 determines whether or not an operation signal is being received from the operation unit 14. When an operation signal is not being received, at step S2, the control unit 11 determines whether or not the receiver 12 is receiving a WAKE signal from the communication controller 20. When a WAKE signal is not being received, the control unit 11 temporarily ends processing. When a WAKE signal is being received, in step S3, the control unit 11 provides the transmitter 13 with an ACK signal together with a frequency control signal, which sets the transmission frequency of the transmitter 13 to the first frequency fa. As a results the transmitter 13 transmits an ACK signal with the first frequency fa via the antenna 13*a*.

Then, in step S4, the control unit 11 determines whether or not the receiver 12 is receiving a request signal from the communication controller 20 within a request signal wait time Δt1 after transmission of the ACK signal. When a request signal is received, in step S5, the control unit 11 transmits an ID code signal, which includes the ID code recorded in the memory 11M, from the transmitter 13 with the frequency fa.

If the request signal is not received within the time Δt1, in step S6, the control unit 11 determines whether or not the transmission frequency of the previously transmitted ACK signal was the second frequency fb. If the transmission frequency was the second frequency fb, the control unit 11 temporarily ends processing. If the transmission frequency was not the second frequency fb, that is, if the transmission frequency was the first frequency fa, the control unit 11 proceeds to step S7.

In step S7, the control unit 11 provides the transmitter 13 with the ACK signal together with a frequency control signal, which sets the transmission frequency of the transmitter 13 to the second frequency fb. Accordingly, when the time Δt1 elapses from the transmission of the ACK signal with the first frequency fa, the transmitter 13 transmits the ACK signal with the second frequency fb. Then, when completing step S7, the control unit 11 returns to step S4. That is, after the transmission of the ACK signal with the first frequency fa, if a request signal is not received within the time Δt1, the control unit 11 changes the transmission frequency to the second frequency fb and retransmits the ACK signal (retransmission control).

<Processing for Unidirectional Communication Control>

In step S1, when the operation signal is received by the portable device 10, in step S8, the control unit 11 of the portable device 10 determines whether or not the operation signal corresponds to a lock-unlock operation. A signal corresponding to a lock-unlock operation is, for example, a lock signal or an unlock signal that is not continuously input but rather input for only a short period in a one-shot manner. As a specific example, the control unit 11 determines a lock-unlock operation when the operation signal is input once during one second. If the operation signal is input twice or more during one second or continuously input for two seconds or longer, the control unit 11 does not determine a lock-unlock operation.

When a lock-unlock operation is performed, in step S9, the control unit 11 transmits a lock-unlock signal with the presently set transmission frequency (initially, the first frequency fa). Subsequently, the control unit 11 proceeds to step S10. If a lock-unlock operation is not performed, the control unit 11 proceeds to step S10 without performing step S10.

In step S10, the control unit 11 determines whether or not the operation signal is a signal corresponding to a frequency changing operation for changing the transmission frequency of the transmitter 13. More specifically, when a lock-unlock signal (lock signal or unlock signal) is received through predetermined operation procedures, the control unit 11 determines that the operation unit 14 has performed a frequency changing operation. Specific examples of the frequency changing operation include operations that differ from normal lock-unlock operations, such as the lock switch and the unlock switch of the operation unit 14 being alternately operated three times each during three seconds or either one of the lock switch and the unlock switch being continuously pushed for three times or longer.

When the operation unit 14 performs a frequency changing operation, in step S11, the control unit 11 changes the transmission frequency. In step S12, the control unit 11 transmits a lock-unlock signal with the changed transmission frequency from the transmitter 13. This temporarily ends the processing. More specifically, in step S11, if the present transmission frequency is the first frequency fa, the control unit 11 sends to the transmitter 13 a frequency control signal for changing the transmission frequency to the second frequency fb. If the present transmission frequency is the second frequency fb, the control unit 11 sends to the transmitter 13 a frequency control signal for changing the transmission frequency to the first frequency fa. Then, the control unit 11 transmits the lock-unlock signal based on the finally input operation signal (lock signal or unlock signal) during the frequency changing operation.

Accordingly, during the unidirectional communication control, the portable device 10 performs the frequency changing operation with the operation unit 14. Thus, transmission frequency of the lock-unlock signal can be freely changed. Further, the lock-unlock signal can be transmitted at the same time as when the transmission frequency is changed.

<Communication Controller 20>

Referring to FIG. 1, the communication controller 20 includes a communication control unit 21, which functions as a data processor and which is formed by a computer unit including a CPU, ROM, and RAM. A transmitter 22 and a receiver 23 are electrically connected to the communication control unit 21.

When receiving a request signal (WAKE signal or request signal) from the communication control unit 21, the transmitter 22 modulates the request signal to a radio wave having a predetermined frequency and transmits the radio wave to an area near the vehicle 2. The transmitter 22 transmits a request signal having a signal intensity enabling communication with the portable device 10 in a narrow area that is within one to two meters from the vehicle 2.

The receiver 23 is capable of receiving the lock-unlock signal, the ID code signal, and the retransmission signal sent from the portable device 10. The receiver 23 demodulates the received signal to a pulse signal and provides the communication control unit 21 with the pulse signal.

Preferably, the receiver 23 is a superheterodyne receiver. In this case, referring to FIG. 4(*a*), the receiver 23 includes, for example, a high-frequency filter 61, a high-frequency amplifier 62, an image cancel mixer 63, an intermediate-frequency filter 64, an intermediate-frequency amplifier 65, and a demodulator 66, which are connected in this order between a receiver antenna 23*a* and the communication control unit 21. The receiver 23 further includes a switch 67, which is connected to the image cancel mixer 63, and first and second local oscillators 68*a* and 68*b*, which are connected to the switch 67. In this case, the switch 67, which is formed by a single pole double throw switch, switches connection states of its contacts in response to a frequency control signal (switch control signal) from the communication control unit 21. In other words, the communication control unit 21 switches the connection states of the switch 67 to select either a connection state of "image cancel mixer 63—first local oscillator 68*a*" or a connection state of "image cancel mixer 63—second local oscillator 68*b*." The first local oscillator 68*a* and the second local oscillator 68*b* are set at different frequencies.

Accordingly, the receiver 23 can receive radio waves of two different frequencies by switching the connection state of the switch 67 between the first and second local oscillators 68*a* and 68*b*. More specifically, the receiver 23 can receive a radio wave having the first frequency fa when the first local oscillator 68*a* is connected to the image cancel mixer 63. Further, the receiver 23 can receive a radio wave having the second frequency fb when the second local oscillator 68*b* is connected to the image cancel mixer 63.

For example, when the local oscillation frequency of the first local oscillator 68*a* is set to 312.605 MHz, the local oscillation frequency of the second local oscillator 68*b* is set to 313.515 MHz, and an intermediate frequency is set to 455 kHz, in a state in which the first local oscillator 68*a* is selected, the receiver 23 can receive a radio wave having the first frequency fa of 312.150 MHz. If the second local oscillator 68*b* is selected, the receiver 23 can receive a radio wave having the second frequency fb of 313.060 MHz. The structure and function of each of the elements 61 to 66 in the receiver 23 are known in the art and will not be described in detail here.

Figure 4:
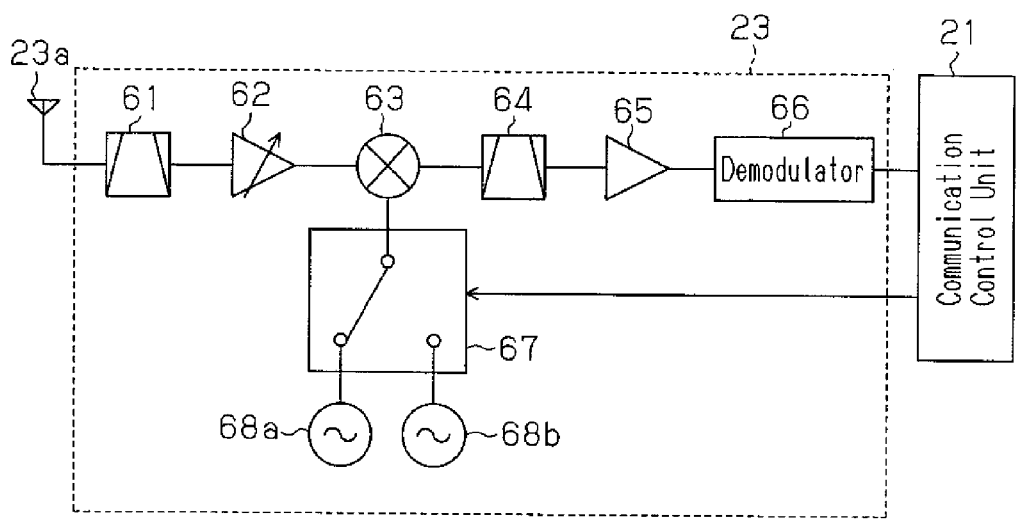
FIGS. 4(a) to 4(c) are block diagrams each showing an example of a receiver in the portable device of FIG. 1.
Figure 4:
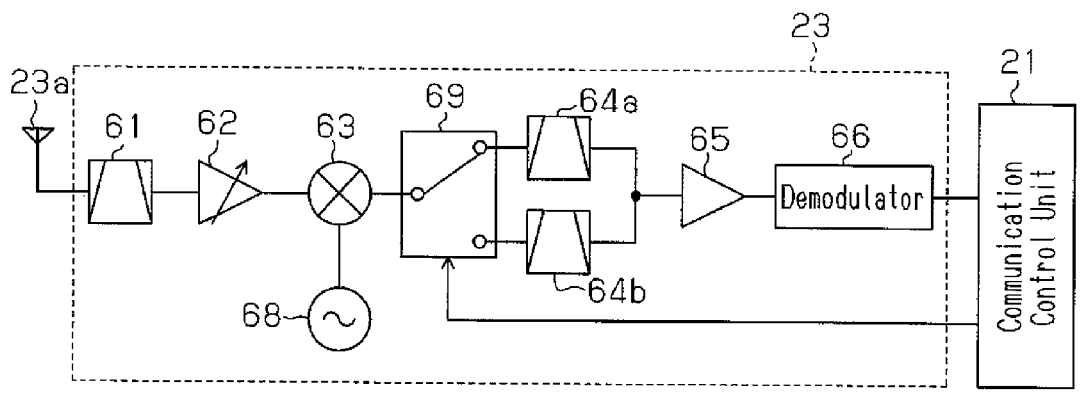
Figure 4:
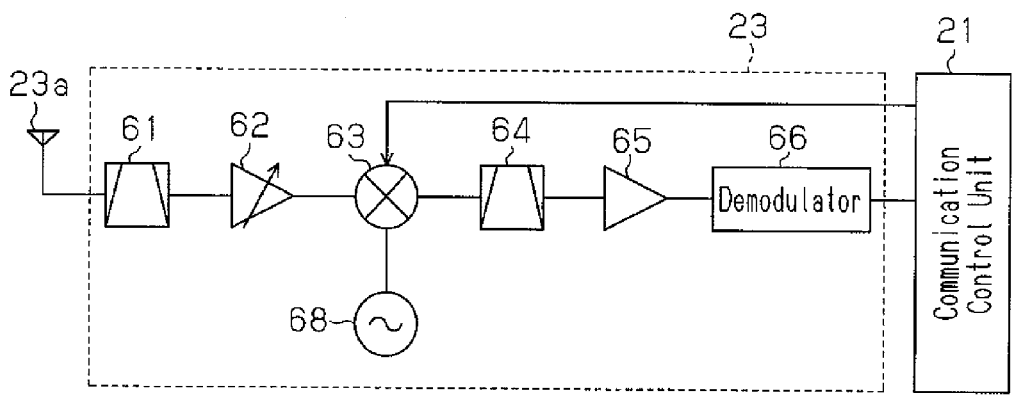

The receiver 23 is not limited to the structure shown in FIG. 4(*a*) and may be configured, for example, as shown in FIG. 4(*b*) or FIG. 4(*c*).

The receiver 23 shown in FIG. 4(*b*) includes a high-frequency filter 61, a high-frequency amplifier 62, an image cancel mixer 63, two intermediate-frequency filters (first and second intermediate-frequency filters 64*a* and 64*b*), an intermediate-frequency amplifier 65, and a demodulator 66. Further, the receiver 23 includes a local oscillator 68, which is connected to the image cancel mixer 63, and a switch 69, which is connected between the image cancel mixer 63 and the intermediate-frequency filters 64*a* and 64*b*. The switch 69 switches connection states of its contacts in response to a frequency control signal (switch control signal) from the communication control unit 21. The communication control unit 21 switches the connection states of the switch 67 to select either a connection state of "image cancel mixer 63—first intermediate-frequency filter 64*a*" or a connection state of "image cancel mixer 63—second intermediate-frequency filter 64*b*." The two intermediate-frequency filters 64*a* and 64*b* have different passage frequencies. Accordingly, the receiver 23 can receive radio waves of two different frequencies in accordance with the connection state of the switch 69. In this example, the intermediate-frequency amplifier 65 is an amplifier corresponding to a broadband.

In the receiver 23 shown in FIG. 4(b), for example, the local oscillation frequency of the local oscillator 68 is 315.515 MHz, the passage frequency of the first intermediate-frequency filter 64a is 1365 kHz, and the passage frequency of the second intermediate-frequency filter 64b is 455 kHz. In this case, if the first intermediate-frequency filter 64a is selected, the receiver 23 receives a radio wave having the first frequency fa of 312.150 MHz. If the second intermediate-frequency filter 64b is selected, the receiver 23 receives a radio wave having the second frequency fb of 313.060 MHz.

The receiver 23 shown in FIG. 4(c) includes a high-frequency filter 61, a high-frequency amplifier 62, an image cancel mixer 63, an intermediate-frequency filter 64, an intermediate-frequency amplifier 65, a demodulator 66, and a local oscillator 68, which is connected to the image cancel mixer 63, and a switch 69, which is connected between the image cancel mixer 63. In this case, the image cancel mixer 63 switches the cancelled image frequency in response to a frequency control signal (switch control signal) from the communication control unit 21. More specifically, the image cancel mixer 63 switches a cancellation frequency band between HI (high) and LO (low) in response to the switch control signal. In a reception signal band of the receiver antenna 23a, the image cancel mixer 63 receives one of the upper and lower parts of a local oscillation signal provided from the local oscillator 68 and cancels the other one of the upper and lower parts as an image signal. For instance, if the cancellation frequency band is set to HI, the image cancel mixer 63 cancels the upper part of the local oscillation signal as an image signal. As a result, the reception signal band becomes lower than the local oscillation signal. If the cancellation frequency band is set to LO, the image cancel mixer 63 cancels the lower part of the local oscillation signal as an image signal. As a result, the reception signal band becomes higher than the local oscillation signal.

In the receiver 23 shown in FIG. 4(c), for example, the local oscillation frequency is set to 312.605 MHz and the intermediate frequency is set to 455 kHz for the local oscillator 68. In this case, if the image cancel mixer 63 is set to HI by the switch control signal from the communication control unit 21, the receiver 23 can receive a radio wave having the first frequency fa of 312.150 MHz. If the image cancel mixer 63 is set to LO by the switch control signal, the receiver 23 can receive a radio wave having the second frequency fb of 313.060 MHz. The configuration of FIG. 4(c) is advantageous in that it uses fewer components than the configurations of FIGS. 4(a) and 4(b).

Further, the receiver 23 may be formed by a PLL circuit like the transmitter 13 of the portable device 10 shown in FIG. 2(c). In this case, the local oscillation frequency of the oscillator in the receiver 23 is changed by the PLL circuit. Accordingly, the receiver 23 can detect radio waves of two different frequencies.

The communication control unit 21 includes a non-volatile memory 21M. The memory 21M records an ACK code and an ID code that are the same as the ACK code and ID code set for the portable device 10 that is associated with the communication control unit 21. Further, a door lock device 24 is electrically connected to the communication control unit 21. The door lock device 24 uses an actuator to automatically lock and unlock a door. More specifically, the door lock device 24 unlocks the door when receiving an unlock signal from the communication control unit 21 and locks the door when receiving a lock signal. The door lock device 24 provides the communication control unit 21 with a lock state signal when locking or unlocking the door in such a manner. Therefore, the communication control unit 21 recognizes the lock state of the door from the lock state signal provided by the door lock device 24.

The communication control unit 21 transmits a request signal (WAKE signal and request signal). When communication is established in response to the request signal with the portable device 10, the communication control unit 21 executes door lock control to enable the door lock device 24 to be driven. More specifically, the communication control unit 21 transmits a request signal, such as a WAKE signal or a request signal, to the portable device 10 with the transmitter 22. In response to the request signal, the portable device 10 transmits a response signal (ACK signal, ID code signal, etc.), and the receiver 23 receives the response signal. Then, the communication control unit 21 determines whether or not the response signal received by the receiver 23 was transmitted from the associated portable device 10. For example, when receiving the ACK signal, the communication control unit 21 compares the ACK code included in the received ACK signal with the ACK code recorded in the memory 21M. If the two ACK codes are the same, the communication control unit 21 recognizes the received ACK signal as having been sent from the associated portable device 10. Further, when receiving the ID code signal, the communication control unit 21 compares the ID code included in the received ID code signal with the ID code recorded in the memory 21M to perform ID code verification. If the ID code is verified, the communication control unit 21 determines that communication has been established between the portable device 10 and the communication control unit 21. Thus, the communication control unit 21 enables the door lock device 24 to be driven. In a state in which the driving of the door lock device 24 is enabled, when a predetermined vehicle operation is performed, the communication control unit 21 outputs a lock signal or an unlock signal to the door lock device 24 and locks or unlocks the door.

The predetermined vehicle operation may be, for example, the touching of a door handle sensor arranged on an outer door handle or the operation of a lock switch arranged on the outer door handle. However, the locking or unlocking of the door may be performed regardless of whether such vehicle operations are performed. In other words, the communication control unit 21 may automatically unlock the door when the ID code is verified and automatically lock the door when the ID code cannot be verified.

When disturbance, such as noise, is mixed in with the ACK signal or ID code signal from the portable device, the ACK code or ID code included in these signals may be modified such that the communication control unit 21 cannot recognize (receive) these signals. That is, communication between the portable device 10 and the communication controller 20 may be disrupted due to disturbance. Therefore, the communication control unit 21 executes a reception frequency changing control to change the reception frequency and prevent communication errors causes by such disturbance. A communication control including the reception frequency changing control and executed by the communication control unit 21 will now be discussed with reference to the flowcharts shown in FIGS. 5 to 7.

<Communication Processing Performed by Communication Control Unit 21>

Figure 5:
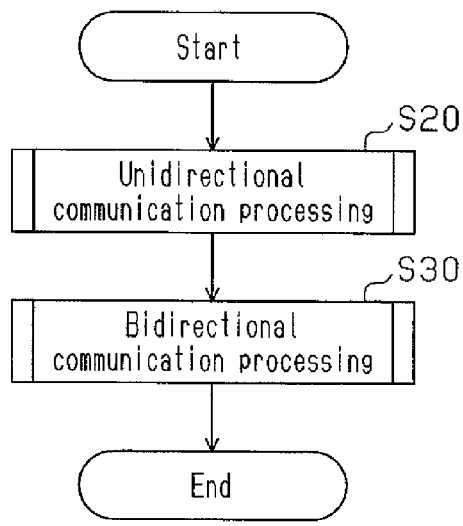
FIG. 5 is a flowchart showing the processing performed by a communication control unit in the communication controller of the first embodiment.

Referring to FIG. 5, the communication control unit 21 performs unidirectional communication processing in step S20 and bidirectional communication processing in step S30.

[Unidirectional Communication Processing]

Figure 6:
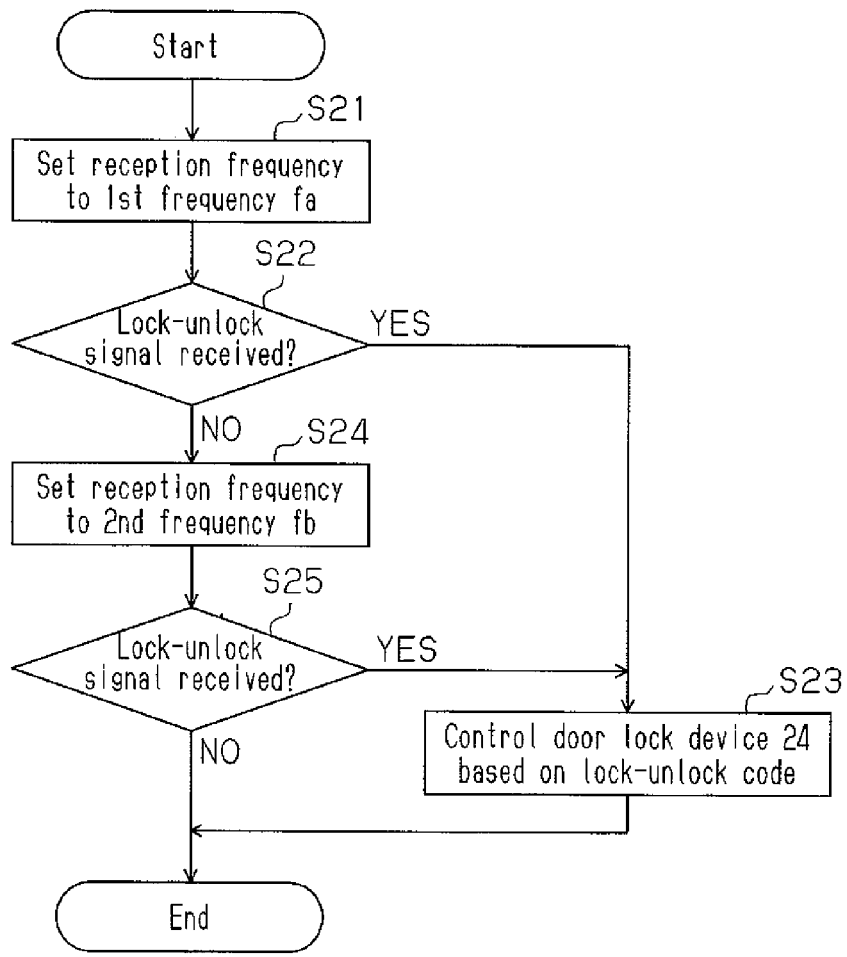
FIG. 6 is a flowchart showing a unidirectional communication process performed by the communication control unit of the first embodiment.

Referring to FIG. 6, first, in step S21, the communication control unit 21 sets the reception frequency of the receiver 23 to the first frequency fa. For example, when the receiver 23 includes the switch 67 and the two local oscillators 68a and 68b as shown in FIG. 4(a), the communication control unit 21 provides the switch 67 with a switch control signal and connects the first local oscillator 68a to the image cancel mixer 63. This sets the reception frequency of the receiver 23 to the first frequency fa.

In step S22, the communication control unit 21 determines whether or not the receiver 23 has received a lock-unlock signal transmitted from the portable device 10 with the first frequency fa. When a lock-unlock signal having the first frequency fa is received, in step S23, the communication control unit 21 drives the door lock device 24 in accordance with the lock-unlock code in the lock-unlock signal and locks or unlocks the door. The communication control unit 21 then temporarily ends processing.

When a lock-unlock signal having the first frequency fa is not received, in step S24, the communication control unit 21 changes the reception frequency of the receiver 23 from the first frequency fa to the second frequency fb. That is, the communication control unit 21 provides the switch 67 with a switch control signal and connects the second local oscillator 68b to the image cancel mixer 63.

In step S25, the communication control unit 21 determines whether or not the receiver 23 has received a lock-unlock signal transmitted from the portable device 10 with the second frequency fb. When a lock-unlock signal having the second frequency fb is received, the communication control unit 21 performs step S23. When a lock-unlock signal having the second frequency fb is not received, the communication control unit 21 ends the unidirectional communication process and performs the bidirectional communication process of step S30 (FIG. 5).

[Bidirectional Communication Processing]

Figure 7:
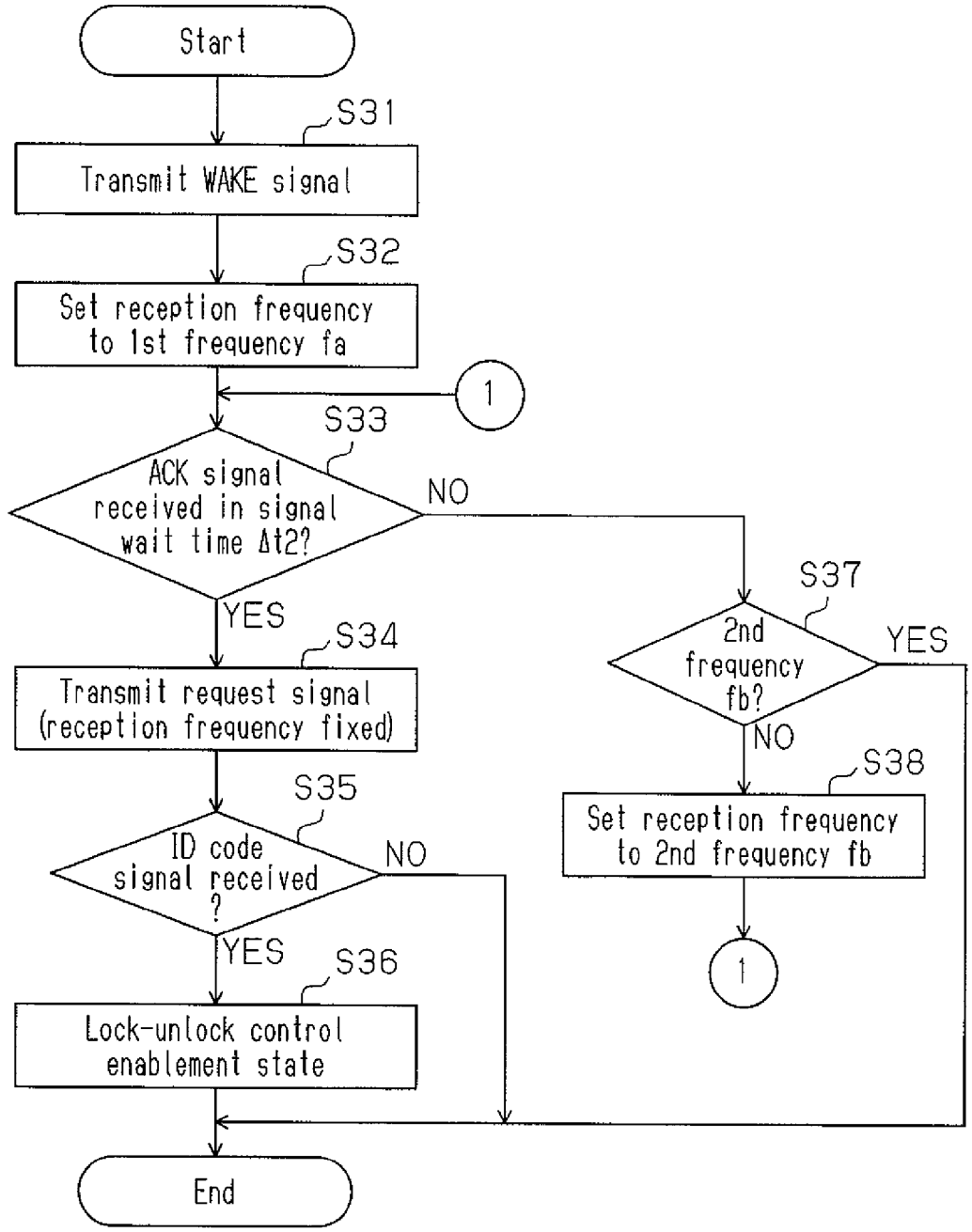
FIG. 7 is a flowchart showing a bidirectional communication process performed by the communication control unit of the first embodiment.
Figure 8:
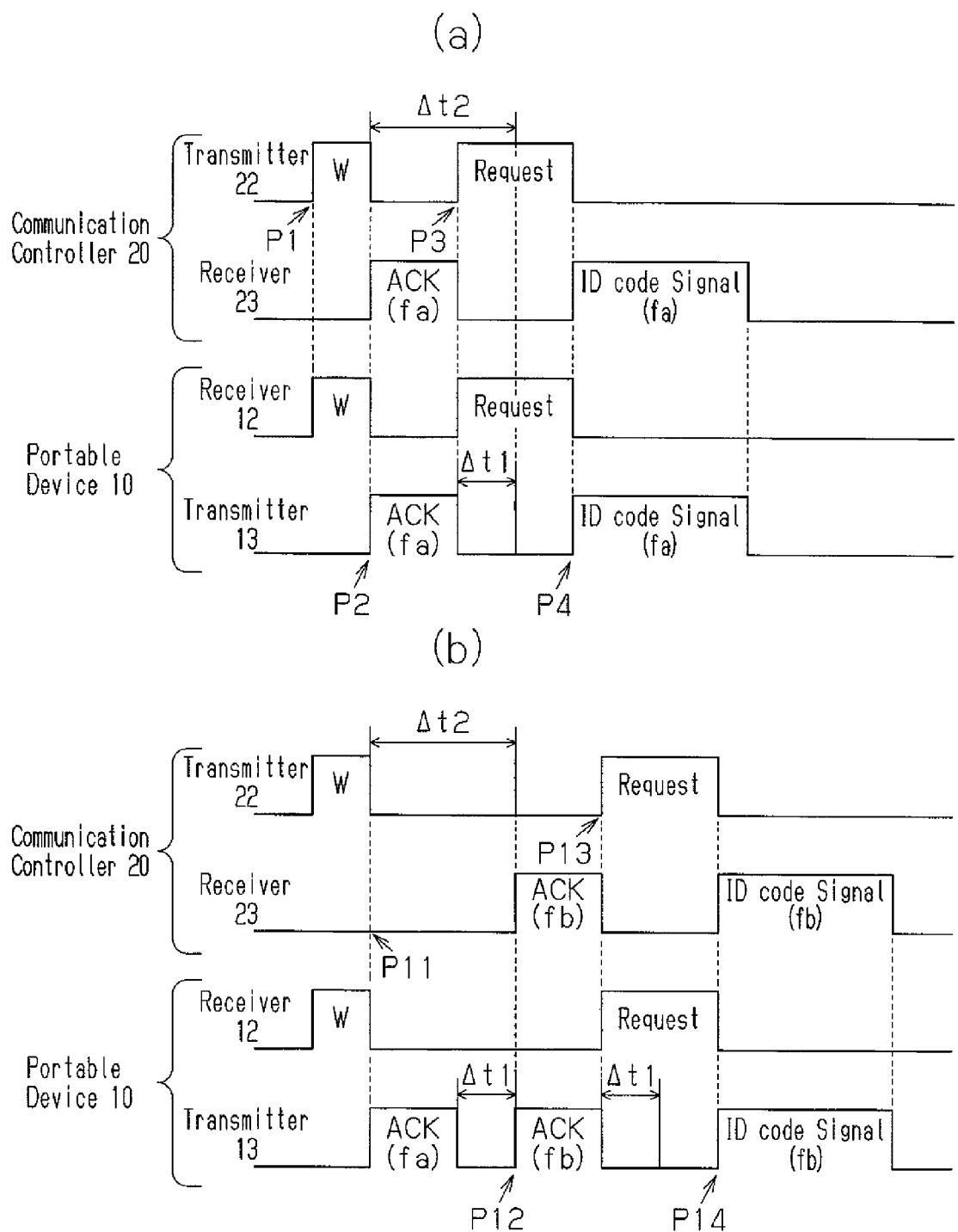
FIGS. 8(a) and 8(b) are time charts showing examples of bidirectional communication in the first embodiment.

Referring to FIG. 7, when performing bidirectional communication processing, in step S31, the communication control unit 21 transmits a WAKE signal from the transmitter 22. Then, in step S32, the communication control unit 21 sets the reception frequency of the receiver 23 to the first frequency fa. Steps S31 and S32 may be performed in a reversed order.

Next, in step S33, the communication control unit 21 determines whether or not the receiver 23 has received an ACK signal from the portable device 10 within an ACK signal wait time Δt2 after transmission of the WAKE signal. If the receiver 23 has received the ACK signal, in step S34, the communication control unit 21 transmits a request signal from the transmitter 22. Afterwards, the communication control unit 21 enters a signal reception wait state and waits for an ID code signal transmitted from the portable device 10 in response to the request signal. When in the signal reception wait state for the ID code signal, the reception frequency of the receiver 23 is maintained. That is, the reception frequency of the receiver 23 is maintained at the frequency used when receiving the ACK signal. In the first embodiment, the ACK signal wait time Δt2 is set to the sum of the time for transmitting the ACK signal from the portable device 10 and the request signal wait time Δt1. Thus, the changing pattern and changing time of the transmission frequency of the portable device 10 is synchronized with the changing pattern and changing time of the reception frequency of the communication controller 20.

In step S35, the communication control unit 21 determines whether or not the receiver 23 has received an ID code signal from the associated portable device 10. If an ID code signal has not been received, the communication control unit 21 temporarily ends processing. If an ID code signal has been received, in step S36, the communication control unit 21 enables execution of a control for locking and unlocking of a door with the door lock device 24. In other words, the communication control unit 21 enters a lock-unlock control enablement state. Then, the communication control unit 21 temporarily ends processing.

If the receiver 23 has not received an ACK signal within the ACK signal wait time Δt2 in step S33, the communication control unit 21 proceeds to step S37 and determines whether or not the present reception frequency of the receiver 23 is the second frequency fb. If the present reception frequency of the receiver 23 is the second frequency fb, the communication control unit temporarily ends processing. If the present reception frequency of the receiver 23 is not the second frequency fb, that is, if the present reception frequency of the receiver 23 is the first frequency fa, the communication control unit 21 proceeds to step S38 and sets the reception frequency of the receiver 23 to the second frequency fb. More specifically, the communication control unit 21 provides the switch 67 of the receiver 23 with a switch control signal and switches from the connection state of the first local oscillator 68a and the image cancel mixer 63 to the connection state of the second local oscillator 68b and the image cancel mixer 63. This switches the reception frequency of the receiver 23 from the first frequency fa to the second frequency fb. In other words, if the ACK signal cannot be received within the ACK signal wait time Δt2 after receiving the WAKE signal, the communication control unit 21 executes a reception frequency changing control to change the reception frequency of the receiver 23.

The operation of the communication control system 1 will now be discussed with reference to the time charts of FIGS. 8(a) and 8(b).

<Example of Communication Establishment when No Disturbance Occurs>

Referring to FIG. 8(a), at point P1, the transmitter 22 of the communication controller 20 transmits a WAKE signal, and the receiver 12 of the portable device 10 receives the WAKE signal. Then, at point P2, the transmitter 13 of the portable device 10 transmits an ACK signal with the first frequency fa.

The reception frequency of the receiver 23 in the communication controller 20 is set to the first frequency fa during the ACK signal wait time Δt2 after transmission of the WAKE signal. Accordingly, the communication controller 20 enables reception of the ACK signal, which is transmitted from the portable device 10 with the first frequency fa. If the receiver 23 receives the ACK signal in a normal manner, at point P3, the communication controller 20 transmits a request signal from the transmitter 22.

If the receiver 12 of the portable device 10 receives the request signal within the request signal wait time Δt1 after transmission of the ACK signal, at point P4, the portable device 10 transmits an ID codes signal from the transmitter 13 with the first frequency fa. If the receiver 23 of the communication controller 20 has normally received the ACK signal, which has the first frequency fa, there is a high probability that an ID code signal having the same frequency (in this case, the first frequency fa) will also be normally received. Accordingly, since there is a high probability of the ID code signal being received in a normal manner, the communication controller 20 can enter the lock-unlock control enablement state.

In this manner, when the communication controller 20 normally receives the ACK signal transmitted from the portable device 10 with the first frequency fa, the control unit 11 of the portable device 10 and the control unit 21 of the communication controller 20 complete mutual communication without executing the frequency changing control.

<Example of Communication Establishment when Disturbance Occurs>

Referring to FIG. 8(b), at point P11, when the receiver 23 of the communication controller 20 cannot normally receive the ACK signal transmitted from the portable device 10 with the first frequency fa in response to the WAKE signal, the communication controller 20 does not transmit a request signal.

In this case, at point P12, after the portable device 10 transmits the ACK signal with the first frequency fa, the request signal wait time Δt1 elapses without a request signal being received. Hence, the portable device 10 retransmits the ACK signal with the second frequency fb (step S7 in FIG. 3). Further, after the communication controller 20 transmits the WAKE signal, the ACK signal wait time Δt2 elapses without receiving an ACK signal with the first frequency fa. Thus, the communication controller 20 changes the reception frequency of the receiver 23 to the second frequency fb (step S38 in FIG. 7). The transmission frequency of the transmitter 13 in the portable device 10 and the reception frequency of the receiver 23 in the communication controller 20 are changed substantially in a synchronized manner. This enables the communication controller 20 to receive an ACK signal transmitted from the portable device 10 with the second frequency fb. If the receiver 23 normally receives the ACK signal with the second frequency fb, at point P13, the communication controller 20 transmits a request signal from the transmitter 22.

If the receiver 12 receives the request signal, at point P14, the portable device 10 transmits an ID code signal from the transmitter 13 with the second frequency fb. When the ID code signal is normally received, the communication controller 20 enters the lock-unlock enablement state.

The vehicle communication control system 1 of the first embodiment has the advantages described below.

(1) If a request signal cannot be received from the communication controller 20 after transmitting the ACK signal with the first frequency fa in response to the WAKE signal, the portable device 10 retransmits the ACK signal (response signal) with a different frequency (second frequency fb). Therefore, even if the communication controller 20 cannot receive the ACK signal in a normal manner due to disturbance, such as noise, the ACK signal retransmitted from the portable device 10 with the second frequency fb establishes mutual communication between the portable device 10 and the communication controller 20.

After the ACK signal wait time ACK Δt2 elapses from when the WAKE signal is transmitted, the communication controller 20 changes the reception frequency of the receiver 23 from the first frequency fa to the second frequency fb. Then, in response to the ACK signal transmitted from the portable device 10 with the second frequency fb, the communication controller 20 transmits a request signal. This ensures that the communication controller 20 can perform wireless communication with the portable device 10, which changes the transmission frequency of the ACK signal. In addition, the increase in the receivable frequency band improves the resistance to disturbance. Accordingly, the communication control system 1 of the first embodiment prevents communication errors, which may be caused when disturbance affects the ACK signal of the portable device 10, between the portable device 10 and the communication controller 20.

(2) When receiving a request signal, the portable device 10 transmits an ID code signal having a frequency that satisfies the transmission conditions of the request signal. In other words, the portable device 10 transmits an ID code signal having the same frequency as the finally transmitted ACK signal. That is, the portable device 10 uses the same frequency for a first response signal and a following second response signal. When normally receiving an ACK signal transmitted from the portable device 10 in response to the WAKE signal, the communication controller 20 transmits the request signal and sets the reception frequency of the receiver 23 at the same frequency as the received ACK signal. The communication controller 20 transmits a request signal when the communication controller 20 normally receives the ACK signal. In response to the request signal, the portable device 10 transmits an ID code signal with the same frequency as the ACK signal (i.e., received ACK signal). In this state, the reception frequency of the communication controller 20 is set at the frequency of the received ACK signal. Thus, there is a high probability that the communication controller 20 can normally receive the ID code signal. This prevents communication errors between the portable device 10 and the communication controller 20.

(3) When normally receiving the ACK signal, the communication controller 20 ends the frequency changing control and transmits a request signal, or executes the next transmission control. This shortens the time for shifting from the frequency changing control to the next transmission control. Further, the responsiveness of communication between the portable device 10 and the communication controller 20 is prevented from being lowered.

(4) When a frequency changing operation is performed with the operation unit 14, the portable device 10 changes the transmission frequency of the lock-unlock signal. In this case, when performing unidirectional communication processing, the communication controller 20 periodically changes the reception frequency during the transmission time of the lock-unlock signal from the portable device 10. This ensures that the communication controller 20 receives the lock-unlock signal regardless of the transmission frequency of the lock-unlock signal. However, for example, if the lock-unlock signal transmitted from the portable device 10 with the first frequency fa is affected by disturbance at the first frequency fa, the communication controller 20 cannot normally recognize the lock-unlock signal. In this case, the frequency changing operation of the portable device 10 changes the transmission frequency of the lock-unlock signal to the second frequency fb. This enables the communication controller 20 to normally recognize the lock-unlock signal. Thus, communication errors between the portable device 10 and the communication controller 20 are prevented.

(5) When a frequency changing operation is performed with the operation unit 14 of the portable device 10, the transmission frequency of the lock-unlock signal transmitted from the transmitter 13 is changed to another frequency. Thus, even after disturbance such as noise disrupts normal reception of the lock-unlock signal, the lock-unlock signal that is transmitted from the portable device 10 with the changed transmission frequency is receivable by the communication controller 20. Thus, communication can be established between the communication controller 20 and the portable device 10. Further, communication errors caused by disturbance can be suppressed.

(6) The operation for transmitting a lock-unlock signal from the portable device 10 (transmission operation) and the operation for changing the transmission frequency of the lock-unlock signal are performed with the same operation unit 14 by carrying out different procedures. The control unit 11 distinguishes the operation procedures to switch between transmission control and frequency changing control. Thus, there is no need for the portable device 10 to have separate operation units, namely, one for the transmission operation and another for the frequency changing operation. This simplifies the structure of the portable device 10. Further, the frequency changing operation is more complicated than the transmission operation. This prevents the frequency changing operation from being performed inadvertently.

(7) When the frequency changing operation is performed with the operation unit 14, the portable device 10 changes the transmission frequency of the lock-unlock signal and transmits the lock-unlock signal with the changed transmission frequency. In other words, the portable device 10 performs a process for changing the transmission frequency and a process for transmitting the lock-unlock signal. Thus, after performing the frequency changing operation, the user does not have to perform a transmission operation for the lock-unlock signal. This improves the usability of the portable device 10. It is preferred that the frequency operation changing operation be performed by consecutively operating the lock switch or the unlock switch of the operation unit for a number of times (for example, three times). In this case, the user can easily change the transmission frequency and transmit the lock-unlock signal by consecutively performing locking or unlocking operations. Further, in this case, the transmission frequency changing operation is performed continuously after the transmission operation of the lock-unlock signal. Thus, the user can perform the transmission frequency operation without being aware of such operation. This significantly increases the usability of the portable device 10.

Second Embodiment

Figure 9:
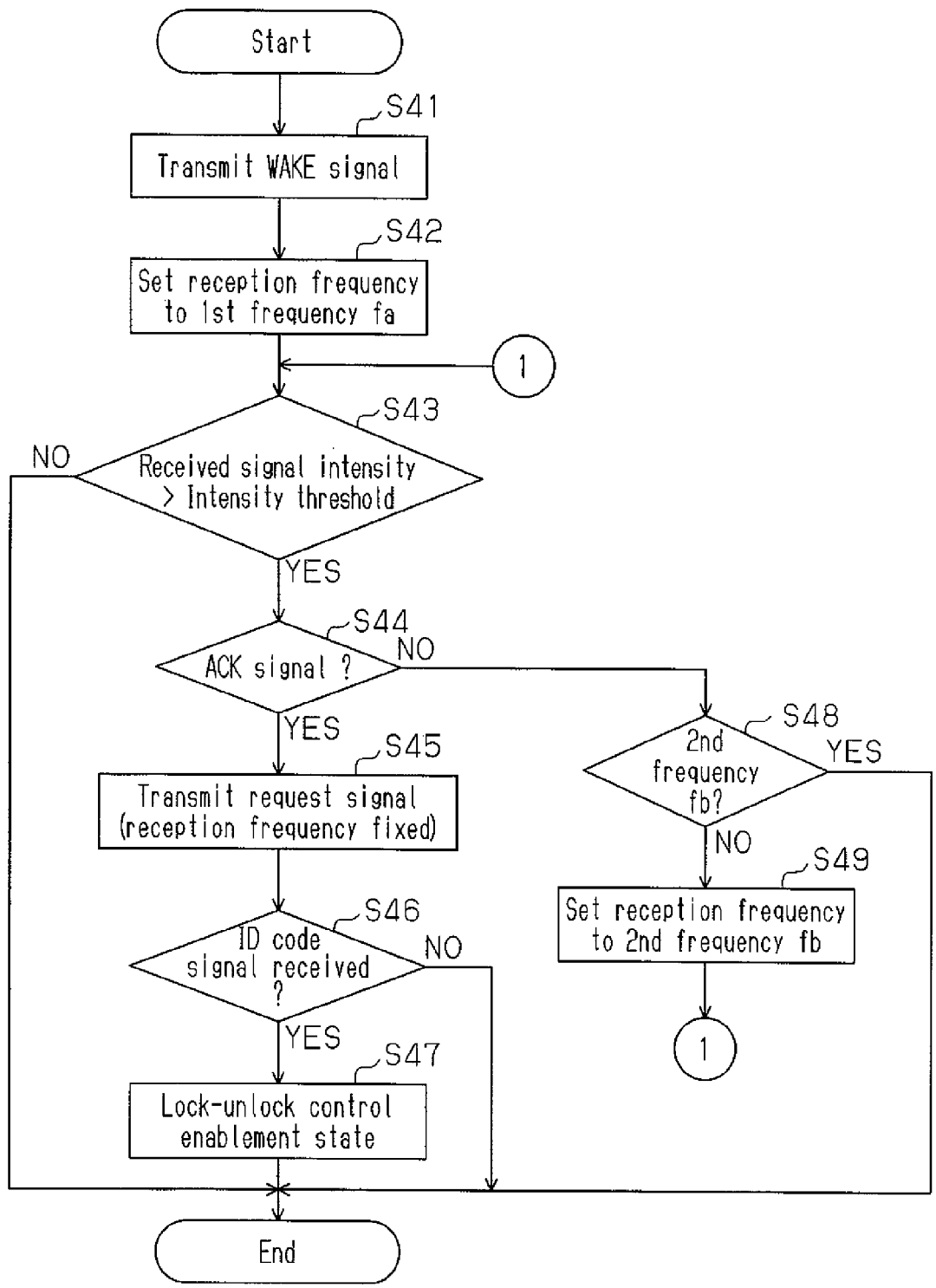
FIG. 9 is a flowchart showing a bidirectional communication process performed by a communication control unit in a second embodiment of the present invention.
Figure 10:
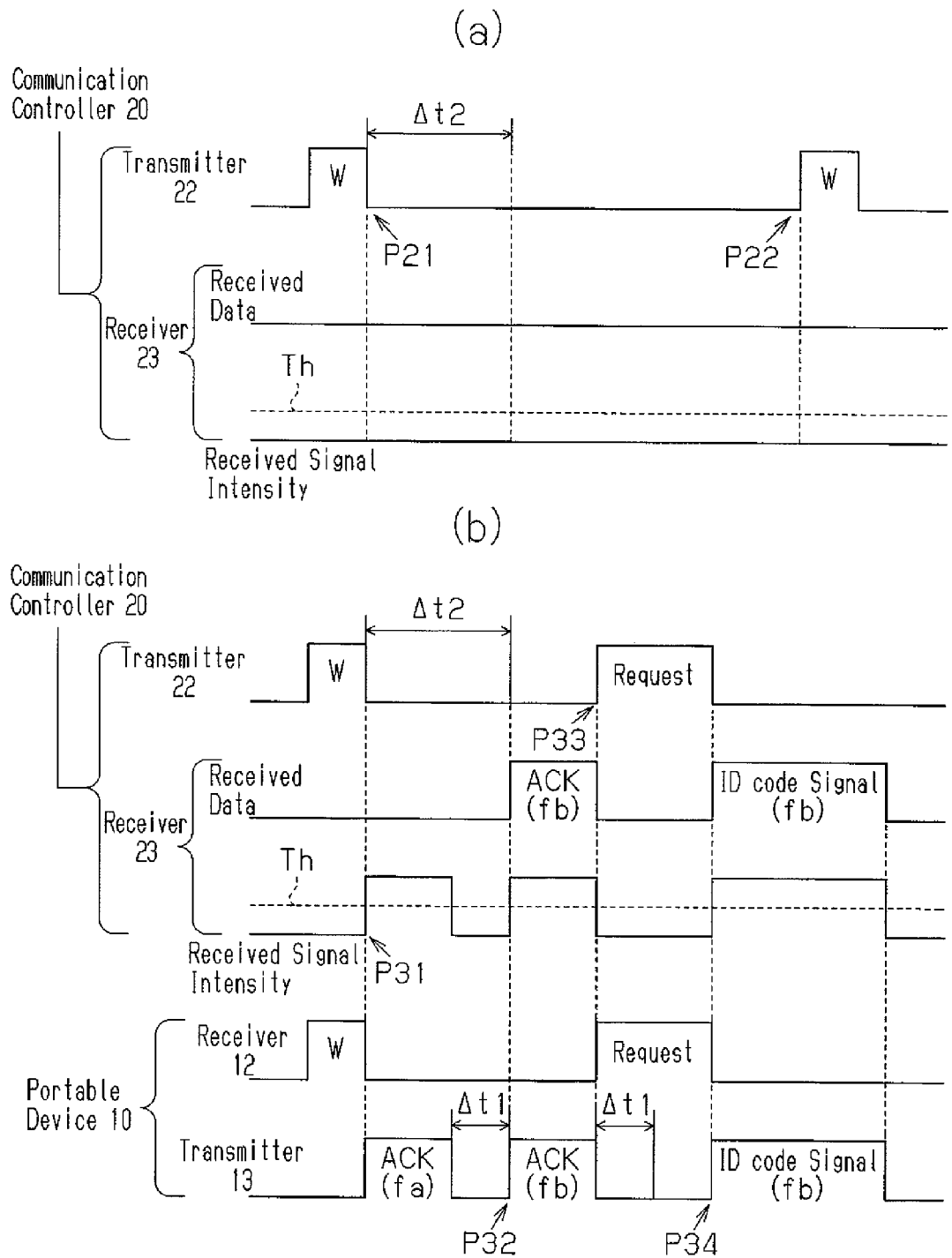
FIGS. 10(a) and 10(b) are time charts showing examples of bidirectional communication in the second embodiment.

A communication control system according to a second embodiment of the present invention will now be described with reference to FIGS. 9 and 10. Hereafter, the discussion of each embodiment, including the second embodiment, will center on differences from the first embodiment. To avoid redundancy, like or same reference numerals are given to those components that are the same or similar in all embodiments. Such components will not be described in detail.

In the second embodiment, the communication controller 20 differs from that of the first embodiment in the functions it has and the processing it performs.

The receiver 23 in the communication controller 20 of the second embodiment has a received signal intensity detection function for detecting the intensity of received radio waves. The receiver 23 detects the intensity of a detected radio wave with the received signal intensity detection function and provides the communication control unit 21 with an intensity detection signal indicating the detected received signal intensity. Accordingly, the communication control unit 21 recognizes the intensity of received radio waves based on the intensity detection signal from the receiver 23.

The communication control unit 21 uses the intensity detection signal from the receiver 23 to execute the reception frequency changing control for changing the reception frequency. The unidirectional communication processing of the communication control unit 21 is performed in the same manner as in the first embodiment. In the second embodiment, the bidirectional communication processing of the communication control unit 21 differs from the first embodiment. The bidirectional communication processing of the second embodiment performed by the communication control unit 21 will now be discussed with reference to the flowchart of FIG. 9.

[Bidirectional Communication Processing Performed by Communication Control Unit 21]

In the same manner as in the first embodiment, when shifting from unidirectional communication processing to bidirectional communication processing, in step S41, the communication control unit 21 transmits a WAKE signal from the transmitter 22. Then, in step S42, the communication control unit 21 sets the reception frequency of the receiver 23 to the first frequency fa. Steps S41 and S42 may be performed in a reversed order.

In step S43, the communication control unit 21 determines whether or not the receiver 23 has received a radio wave with an intensity that is greater than a predetermined intensity threshold Th within the ACK signal wait time Δt2 after transmission of the WAKE signal. If the received signal intensity is less than or equal to the intensity threshold Th, the communication control unit 21 temporarily ends processing. That is, the communication control unit 21 temporarily ends processing not only when a radio wave cannot be received by the receiver 23 during the ACK signal wait time Δt2 but also when the intensity of the received radio wave does not exceed the intensity threshold Th.

If the received signal intensity is greater than the intensity threshold, in step S44, the communication control unit 21 determines whether or not the received radio wave is an ACK signal that has been transmitted from the associated portable device 10. When the received radio wave is an ACK signal, the communication control unit 21 sequentially performs steps S45 to S47 under the present transmission conditions (transmission frequency, reception frequency, etc.). If the received radio wave is not an ACK signal, the communication control unit 21 sequentially performs steps S48 and S49 under the present transmission conditions (transmission frequency, reception frequency, etc.). The processing of steps S45 to S49 is the same as the processing of steps S34 to S38 of the first embodiment shown in FIG. 7. After step S49, the communication control unit 21 returns to step S43.

The operation of the communication control system 1 in the second embodiment will now be discussed with reference to the time charts of FIGS. 10(a) and 10(b).

<Example of Non-Establishment of Communication when No Disturbance Occurs>

Referring to FIG. 10(a), at point P21, the transmitter 22 of the communication controller 20 transmits a WAKE signal. If the receiver 12 does not receive a radio wave with an intensity exceeding the intensity threshold Th during the ACK signal wait time Δt2 after transmission of the WAKE signal, at point P22, the WAKE signal is transmitted again at a predetermined intermittent cycle. That is, if a radio wave having an intensity exceeding the intensity threshold Th cannot be received during the ACK signal wait time Δt2, the communication controller 20 determines that the portable device 10 is not located in the communication area and thus does not execute the frequency changing control.

<Example of Communication Establishment when Disturbance Occurs>

Referring to FIG. 10(b), at point P31, the receiver 23 of the communication controller 20 receives the ACK signal (intensity being greater than threshold intensity) transmitted from the portable device 10 with the first frequency fa in response to the WAKE signal. However, the communication control unit 21 cannot recognize the received ACK signal due to disturbance, such as noise. Thus, the communication controller 20 does not transmit a request signal.

In this case, after the portable device 10 transmits the ACK signal with the first frequency fa, at point P32, the request signal wait time Δt1 elapses without a request signal being received. Hence, the portable device 10 retransmits the ACK signal with the second frequency fb. Further, after the communication controller 20 transmits the WAKE signal, the ACK signal wait time Δt2 elapses without an ACK signal having the first frequency fa being received. Thus, the communication controller 20 changes the reception frequency of the receiver 23 to the second frequency fb (step S38 in FIG. 7). The transmission frequency of the transmitter 13 in the portable device 10 and the reception frequency of the receiver 23 in the communication controller 20 are changed substantially in a synchronized manner. This enables the communication controller 20 to receive an ACK signal that is transmitted from the portable device 10 with the second frequency fb. If the receiver 23 normally receives the ACK signal, which has the second frequency fb, at point P33, the communication controller 20 transmits a request signal from the transmitter 22.

If the receiver 12 receives the request signal, at point P34, the portable device 10 transmits an ID code signal with the second frequency fb from the transmitter 13. When the ID code signal is normally received, the communication controller 20 enters the lock-unlock enablement state.

In addition to advantages (1) to (7) of the first embodiment, the vehicle communication control system 1 of the second embodiment has the advantages described below.

(8) The communication control unit 21 detects the intensity of a radio wave received from the receiver 23 and determines whether or not a wireless signal (radio wave) has been received from the detection result. If a radio wave exceeding the intensity threshold cannot be received, the communication control unit 21 determines that the portable device 10 is not located in the communication area and thus does not execute the reception frequency changing control. Therefore, the communication controller 20 executes the reception frequency changing control only when necessary. This prevents the power consumption of the communication controller 20 from increasing.

Third Embodiment

Figure 11:
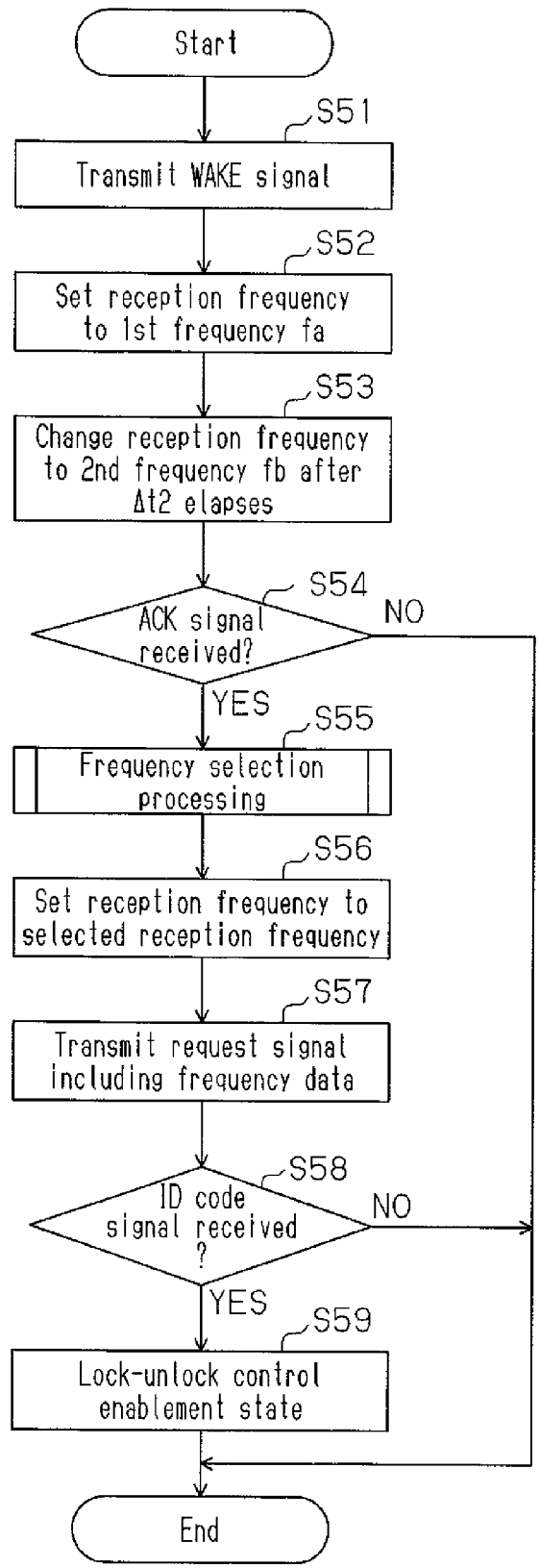
FIG. 11 is a flowchart showing a bidirectional communication process performed by a communication control unit in a third embodiment of the present invention.

A communication control system according to a third embodiment of the present invention will now be described with reference to FIGS. 11 to 13.

In the third embodiment, the communication processing performed by the control unit 11 of the portable device 10 and the bidirectional communication process performed by the communication control unit 21 of the controller 20 differ from the second embodiment. Accordingly, the communication processing performed by the control unit 11 and the communication control unit 21 will now be discussed.

[Bidirectional Communication Processing Performed by Communication Control Unit 21]

First, bidirectional communication processing performed by the communication control unit 21 of the communication controller 20 will be described with reference to the flowchart of FIG. 11.

In the same manner as in the first embodiment, when shifting from unidirectional communication processing to bidirectional communication processing, in step S51, the communication control unit 21 transmits a WAKE signal from the transmitter 22. Then, in step S52, the communication control unit 21 sets the reception frequency of the receiver 23 to the first frequency fa. Steps S51 and S52 may be performed in a reversed order.

In step S53, after the ACK signal wait time Δt2 elapses from when the WAKE signal is transmitted, the communication control unit 21 changes the reception frequency of the receiver 23 to the second frequency fb.

In step S54, the communication control unit 21 determines whether or not an ACK signal has been transmitted from the associated portable device 10. If an ACK signal is not received, the communication control unit 21 temporarily ends processing. If an ACK signal is received, the communication control unit 21 proceeds to step S55 and performs a frequency selection process.

In the third embodiment, the communication control unit 21 is configured so that an ACK signal can be received from the portable device 10 at all selectable frequencies (here, the first frequency fa and the second frequency fb) to perform the frequency selection process. Among the received ACK signals, the communication control unit 21 selects the frequency of the optimal ACK signal. In step S55, based on the pulse length and signal intensity of each of a received ACK signal having the first frequency fa and a received ACK signal having the second frequency fb, the optimal one of the frequencies fa and fb is selected. In this case, the communication control unit 21 may select the optimal frequency based on only either the pulse length or the signal intensity of each ACK signal. When selecting the optimal frequency based on only the pulse length of the ACK signal, the communication control unit 21 does not necessarily have to detect the intensity of the received radio wave or output an intensity detection signal indicating the intensity to the communication control unit 21. In other words, the signal intensity detection function of the receiver 23 may be eliminated to simplify the structure of the receiver 23 and the processing performed by the communication control unit 21.

Then, in step S56, the communication control unit 21 sets the reception frequency of the receiver 23 to the selected frequency. In step S57, the communication control unit 21 transmits from the transmitter 22 a request signal including frequency data indicating the selected frequency.

Subsequently, in step S58, the communication control unit 21 determines whether or not the receiver 23 has received an ID code signal from the associated portable device 10. If the ID code signal has not been received, the communication control unit 21 temporarily ends processing. If the ID code signal has been received, in step S59, the communication control unit 21 enters a lock-unlock control enablement state to enable execution of control for locking and unlocking a door with the door lock device 24. Then, the communication control unit 21 temporarily ends processing.

<Communication Processing Performed by Control Unit 11>

Next, communication processing performed by the control unit 11 of the portable device 10 will be described with reference to the flowchart of FIG. 12.

<Processing for Mutual Communication Control>

Figure 12:
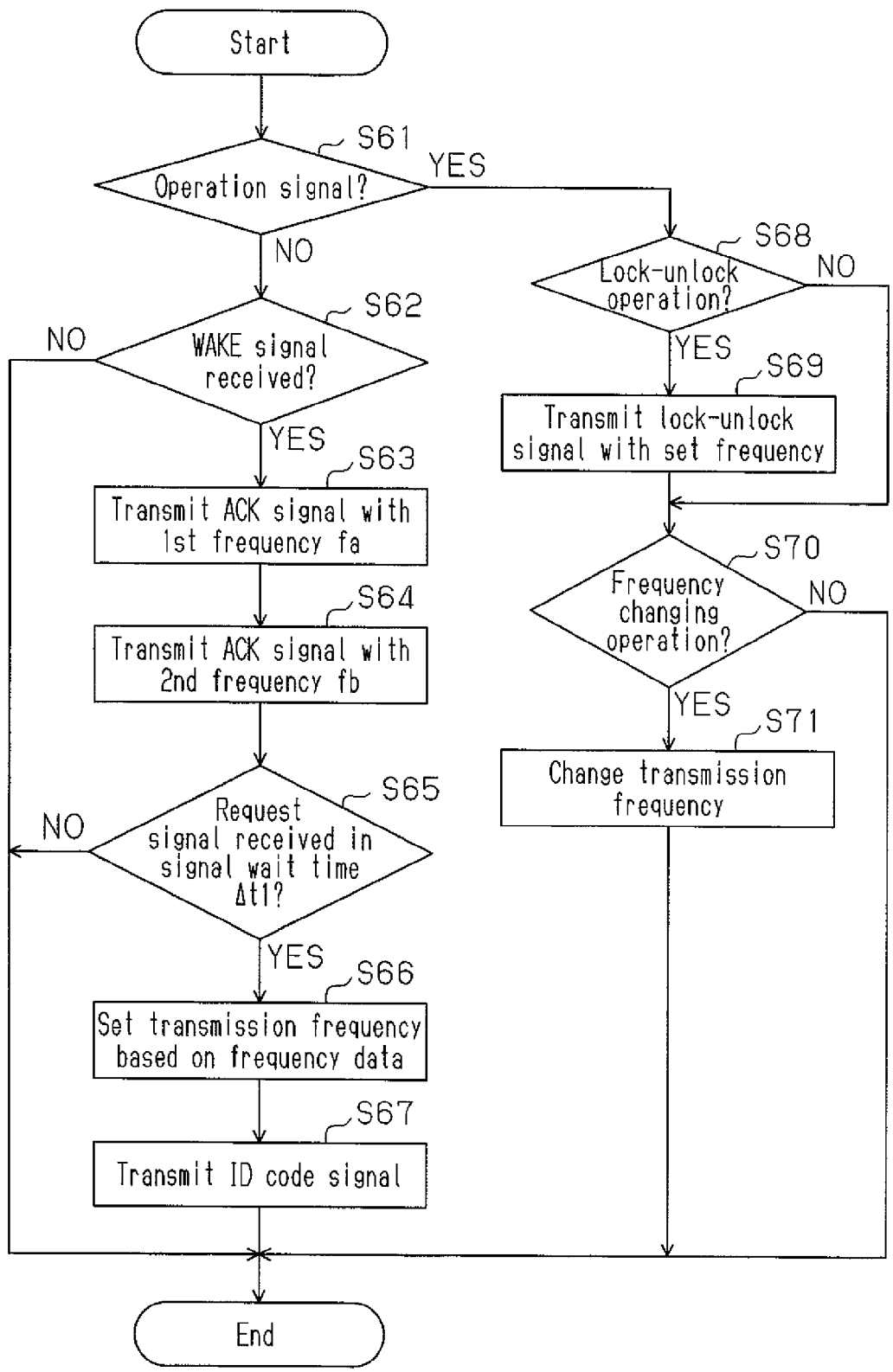
FIG. 12 is a flowchart showing the processing performed by a control unit of a portable device in the third embodiment.

Referring to FIG. 12, in step S61, the control unit 11 determines whether or not an operation signal is being received from the operation unit 14. When an operation signal is not being received, at step S62, the control unit 11 determines whether or not the receiver 12 is receiving a WAKE signal from the communication controller 20. When a WAKE signal is not being received, the control unit 11 temporarily ends processing. When the WAKE signal is being received, in step S63, the control unit 11 provides the transmitter 13 with an ACK signal together with a frequency control signal, which sets the transmission frequency of the transmitter 13 to the first frequency fa. As a result, the transmitter 13 transmits the ACK signal with the first frequency fa via the transmitter antenna 13a.

Then, in step S64, after the request signal wait time Δt1 elapses from the transmission of the ACK signal with the first frequency fa, the control unit 11 provides the transmitter 13 with the ACK signal together with a frequency control signal, which sets the transmission frequency of the transmitter 13 to the second frequency fb. As a result, the transmitter 13 transmits the ACK signal with the second frequency fb via the transmitter antenna 13a.

In step S65, the control unit 11 determines whether or not the receiver 12 is receiving a request signal from the communication controller 20 within the request signal wait time Δt1 after transmission of the ACK signal with the second frequency fb. When the request signal is not received, the control unit 11 temporarily ends processing. When the request signal is received within the request signal wait time Δt1, the control unit 11 proceeds to step S66.

In step S66, the control unit 11 sets the transmission frequency of the transmitter 13 based on the frequency data included in the received request signal. More specifically, if the frequency data indicates the first frequency fa, the control unit 11 sets the transmission frequency to the first frequency fa. If the frequency data indicates the second frequency fb, the control unit 11 sets the transmission frequency to the second frequency fb.

In step S67, the control unit 11 transmits an ID code signal, which includes the ID code recorded to the memory 11M, from the transmitter 13 with the set transmission frequency.
<Unidirectional Communication Control>

In step S61, when the operation signal is received by the portable device 10, the control unit 11 accordingly performs steps S68 to S71. The processing of steps S68 to S71 is the same as the processing of steps S8 to S11 shown in FIG. 3 and thus will not be discussed.

The operation of the communication control system 1 in the third embodiment will now be discussed with reference to the time chart of FIG. 13.

Figure 13:
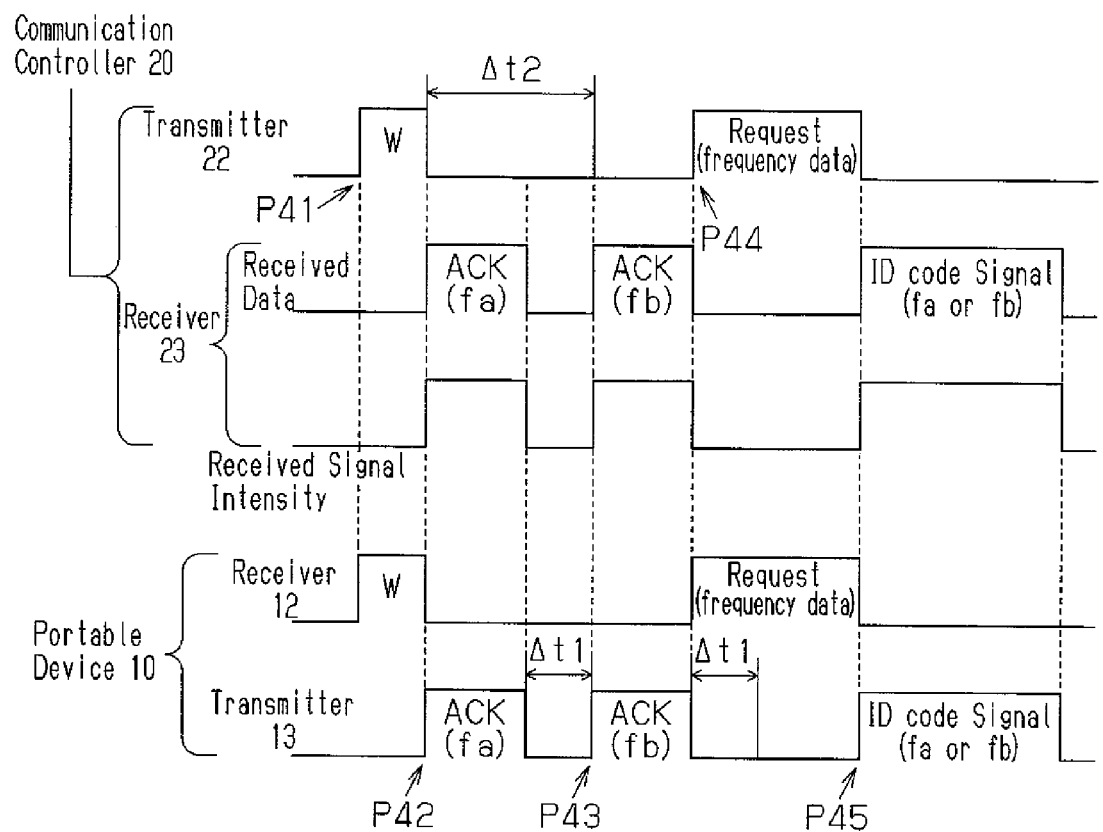
FIG. 13 is a time chart showing an example of bidirectional communication in the third embodiment.

In FIG. 13, at point P41, the transmitter 22 of the communication controller 20 transmits a WAKE signal, and the receiver 12 of the portable device 10 receives the WAKE signal. Then, at point P42, the transmitter 13 of the portable device 10 transmits an ACK signal with the first frequency fa. At this point of time, the reception frequency of the receiver 23 in the communication controller 20 is set to the first frequency fa. Thus, an ACK signal having the first frequency fa is receivable by the communication controller 20.

Then, at point P43, when the request signal wait time Δt1 elapses, the portable device 10 transmits an ACK signal from the transmitter 13 with the second frequency fb. In this state, the reception frequency of the receiver 23 in the communication controller 20 is changed to the second frequency fb. Thus, the ACK signal having the second frequency fb is receivable by the communication controller 20.

When receiving an ACK signal having the first frequency fa and an ACK signal having the second frequency fb, the communication controller 20 performs frequency selection processing and, at point P44, transmits a request signal including the frequency data indicating the selected one of the first frequency fa and second frequency fb.

The receiver 12 of the portable device 10 receives the request signal within the request signal wait time Δt1 after transmission of the ACK signal (second frequency fb). At point P45, the portable device 10 transmits an ID code signal from the transmitter 13 with a frequency that is in accordance with the frequency data included in the request signal.

In addition to advantages (1) to (7) of the first embodiment, the vehicle communication control system 1 of the third embodiment has the advantage described below.

(9) In response to a WAKE signal, the portable device 10 transmits an ACK signal for each selectable frequency (steps S63 and S64 in FIG. 12). Then, the portable device 10 receives a request signal including frequency data and transmits a request signal with a frequency that is in accordance with the frequency data (step S66 in FIG. 12). Meanwhile, after transmitting the WAKE signal, the communication controller 20 executes reception frequency changing control (step S53 in FIG. 11) to receive the ACK signals for every selectable frequency. Afterwards, the communication controller 20 selects an optimal one of the ACK signals and transmits a request signal including frequency data indicating the frequency of the selected ACK signal. Accordingly, the portable device 10 transmits an ID code signal having the frequency selected by the communication controller 20. That is, the communication controller 20 sets the frequency of the ID code signal transmitted from the portable device 10 at the optical value. Thus, the ID code signal has the optimal frequency under the present situation. This improves the accuracy of communication between the portable device 10 and the communication controller 20.

Fourth Embodiment

Figure 14:
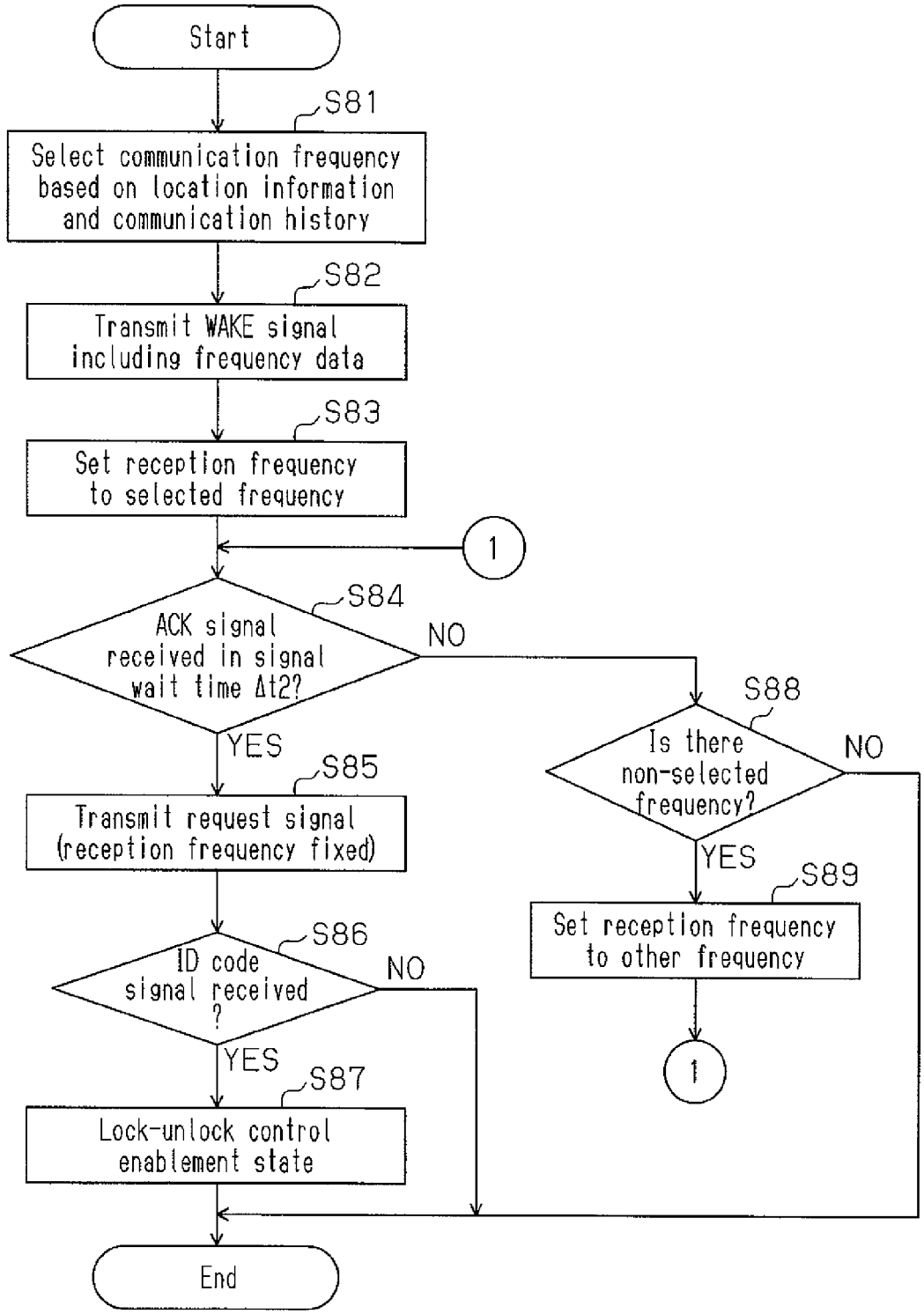
FIG. 14 is a flowchart showing a bidirectional communication process performed by a communication control unit in a fourth embodiment of the present invention.
Figure 15:
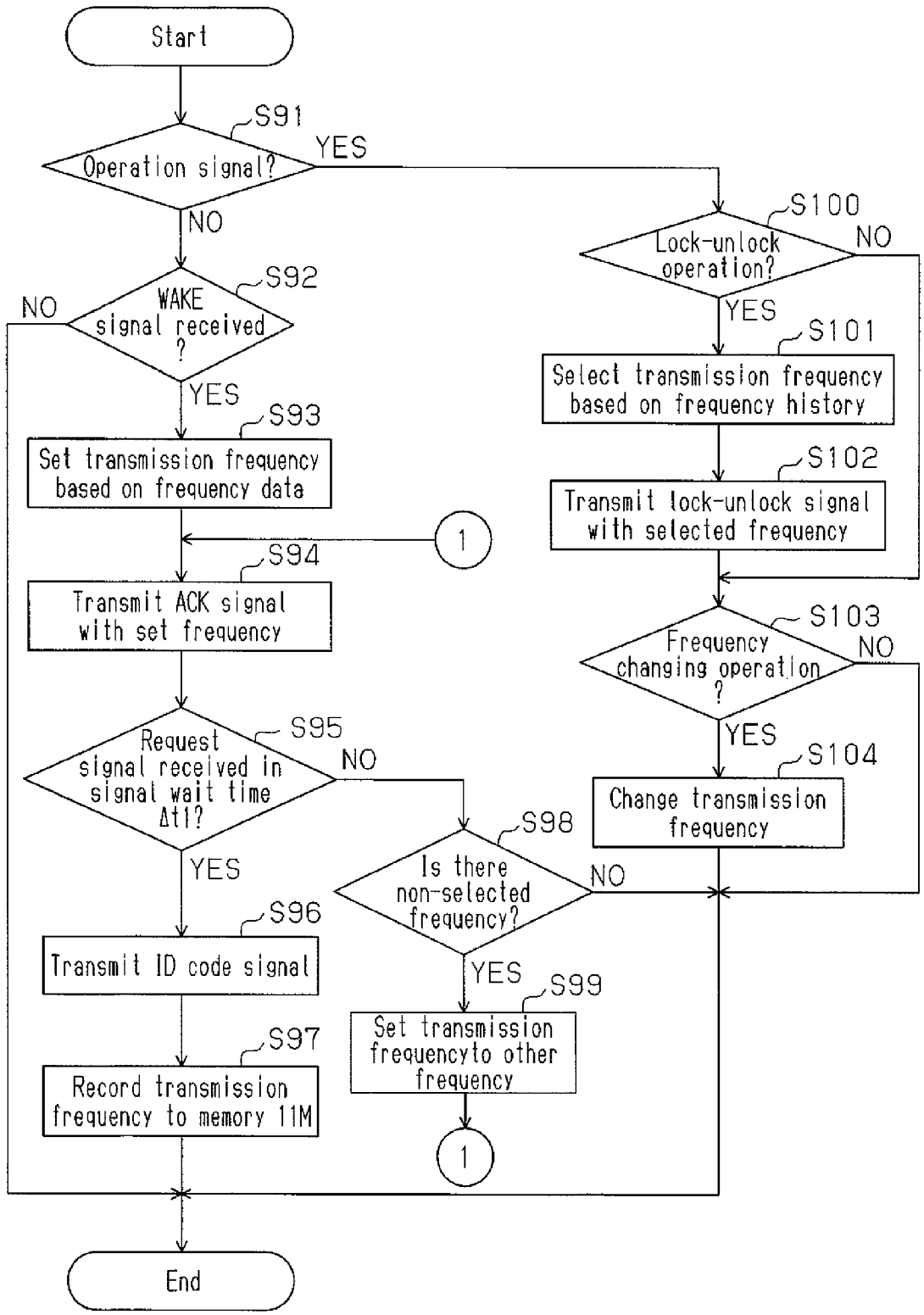
FIG. 15 is a flowchart showing the processing performed by a control unit of a portable device in the fourth embodiment.

A communication control system 1 according to a fourth embodiment of the present invention will now be discussed with reference to FIGS. 14 and 15.

In the fourth embodiment, a location information acquisition device 71, which is shown by the double-dotted lines in FIG. 1, is electrically connected to the communication control unit 21 of the communication controller 20. The location information acquisition device 71 is, for example, a car navigation system installed in the vehicle 2, and provides the communication control unit 21 with acquired information pertaining to the location of the vehicle 2.

When an ID code signal and a lock-unlock signal is normally received from the portable device 10, that is, when communication is established with the portable device 10, the communication control unit 21 generates communication history information, which associates the reception frequency of the receiver 23 when communication is established with the location information. Then, the communication control unit 21 records the communication history information in the memory 21M.

The communication control unit 21 executes frequency changing control based on location information from the location information acquisition device and the communication history information recorded in the memory 21M. Bidirectional communication processing performed by the communication control unit 21 in the fourth embodiment will now be discussed with reference to the flowchart of FIG. 14. Unidirectional communication processing is performed in the same manner as the above embodiments and thus will not be described.
<Bidirectional Communication Processing Performed by Communication Control Unit 21>

When shifting from unidirectional communication processing to bidirectional communication processing in the same manner as the first embodiment, in step S81, the communication control unit 21 first selects a communication frequency based on the location information acquired by the location information acquisition device 71 and the communication history information recorded on the memory 21M.

More specifically, the communication control unit 21 reads from the memory 21M communication history information that is associated with the acquired location information. When associated communication history information is recorded in the memory 21M, the communication control unit 21 selects the frequency included in that communication history information as the communication frequency. When associated communication history information is not recorded in the memory 21M, the communication control unit 21 selects the frequency that appears most often in all of the communication history information recorded in the memory 21M. If no communication history information is recorded in the memory 21M, the communication control unit 21 selects an initial frequency (here, the first frequency fa) as the communication frequency.

In step S82, the communication control unit 21 transmits from the transmitter 22 a WAKE signal that includes frequency data indicating the selected communication frequency. Then, in step S83, the communication control unit 21 sets the reception frequency of the receiver 23 to the selected communication frequency. Steps S82 and S83 may be performed in a reversed order.

In step S84, the communication control unit 21 determines whether or not an ACK signal has been received from the associated portable device 10 within the ACK signal wait time Δt2 after transmission of the WAKE signal. When an ACK signal has been received, in step S85, the communication control unit 21 transmits a request signal from the transmitter 22. Then, the communication control unit 21 enters a signal reception wait state and waits for an ID code signal transmitted from the portable device 10 in response to the request signal. When in the signal reception wait state for the ID code signal, the reception frequency of the receiver 23 is maintained.

In step S86, the communication control unit 21 determines whether or not the receiver 23 has received an ID code signal from the associated portable device 10. If an ID code signal has not been received, the communication control unit 21 temporarily ends processing. If an ID code signal has been received, in step S87, the communication control unit 21 enters a lock-unlock control enablement state to enable execution of a control for locking and unlocking a door with the door lock device 24. Then, the communication control unit 21 temporarily ends processing.

If the receiver 23 has not received an ACK signal within the ACK signal wait time Δt2 in step S84, the communication control unit 21 proceeds to step S88. In step S88, the communication control unit 21 determines whether or not the selectable frequencies (here, the first frequency fa and the second frequency fb) includes a frequency that has not been selected as the communication frequency. If no non-selected frequencies are included, the communication control unit 21 temporarily ends processing. If a non-selected frequency is included, in step S89, the communication control unit 21 sets one of the non-selected frequency as the reception frequency. Then, the communication control unit 21 returns to step S84.

<Communication Processing Performed by Control Unit 11>

Communication processing performed by the control unit 11 of the portable device 10 will now be discussed with reference to the flowchart of FIG. 15.

<Processing Performed During Mutual Communication Control>

First, in step S91, the control unit 11 determines whether or not an operation signal is being received from the operation unit 14. When an operation signal is not being received, at step S92, the control unit 11 determines whether or not the receiver 12 is receiving a WAKE signal from the communication controller 20.

When a WAKE signal is not being received, the control unit 11 temporarily ends processing. When a WAKE signal is being received, in step S93, the control unit 11 sets the transmission frequency of the transmitter 13 based on frequency data, which is included in the WAKE signal. For example, if the frequency data indicates the first frequency fa, the control unit 11 sets the transmission frequency of the transmitter 13 to the first frequency fa. Then, in step S94, the transmitter 13 transmits an ACK signal with the set frequency.

Then, in step S95, the control unit 11 determines whether or not the receiver 12 is receiving a request signal from the communication controller 20 within the request signal wait time Δt1 after transmission of the ACK signal. When the request signal is received, in step S96, the control unit 11 transmits an ID code signal, which includes the ID code recorded to the memory 11M, from the transmitter 13. The control unit 11 transmits the ID code signal with the same frequency as the ACK signal. In step S97, the control unit 11 records the transmission frequency of the transmitted ID code signal as the frequency history information in the memory 11M.

In step S95, if the request signal is not received within the time Δt1, in step S98, the control unit 11 determines whether or not there is a frequency that has not been selected as a transmission frequency. If there are no non-selected frequencies, the control unit 11 temporarily ends processing. If there is a non-selected frequency, in step S99, the control unit 11 sets one of the non-selected frequencies as the transmission frequency. Then, the control unit 11 returns to step S94. That is, after the ACK signal is transmitted with the frequency determined by the frequency data, if a request signal is not received within the time Δt1, the control unit 11a changes the transmission frequency to another frequency and retransmits the ACK signal (retransmission control).

<Processing for Unidirectional Communication Control>

In step S91, when the operation signal is received, in step S100, the control unit 11 of the portable device 10 determines whether or not the operation signal corresponds to a lock-unlock operation.

When a lock-unlock operation is performed (lock-unlock signal was received), in step S101, the control unit 11 selects the transmission frequency based on the frequency history information recorded in the memory 11M. More specifically, the control unit 11 selects from the frequency history information the frequency that is most often used as the transmission frequency. Then, in step S102, the control unit 11 transmits a corresponding lock-unlock signal to the transmitter 13 with the selected frequency.

After completing step S102 or after generating a negative determination in step S100, the control unit 11 proceeds to step S103 and determines whether or not the operation unit 14 has generated an operation signal corresponding to a frequency changing operation. If a frequency changing operation has not been performed, the control unit 11 temporarily ends processing. If a frequency changing operation has been performed, in step S104, the control unit 11 performs processing for changing the transmission frequency. This temporarily ends processing. More specifically, in step S104, if the present transmission frequency is the first frequency fa, the control unit 11 sends to the transmitter 13 a frequency control signal for changing the transmission frequency to the second frequency fb. If the present transmission frequency is the second frequency fb, the control unit 11 sends to the transmitter 13 a frequency control signal for changing the transmission frequency to the first frequency fa.

Accordingly, during the unidirectional communication control, the portable device 10 performs the frequency changing operation with the operation unit 14. Thus, transmission frequency of the lock-unlock signal can be freely changed.

In addition to advantages (1) to (7) of the first embodiment, the vehicle communication control system 1 of the fourth embodiment has the advantages described below.

(10) When there is a history of communication establishment between the vehicle 2 and the portable device 10 at a certain location, the communication control unit 21 of the communication controller 20 selects the communication frequency based on the history. The communication controller 20 transmits the ACK signal and the ID code signal, which are given priority, with the frequency determined by the frequency data. This increases the probability of communication between the portable device 10 and the communication controller 20 being satisfied at an early stage.

(11) When changing the transmission frequency of an operation signal, the control unit 11 of the portable device 10 selects frequencies having higher priority based on the frequency history information recorded in the memory 11M. Thus, when setting the transmission frequency, a frequency with a higher communication establishment probability is given priority. This reduces the number of times the frequency changing operation must be performed to establish communication. Thus, the time required for the establishment of communication is shortened.

Fifth Embodiment

A communication control system 1 according to a fifth embodiment of the present invention will now be discussed with reference to FIGS. 3 and 16 to 18.

The fifth embodiment differs from the first embodiment in the bidirectional communication processing performed by the control unit 11 of the portable device 10 and the bidirectional communication processing performed by the communication control unit 21 of the communication controller 20. The communication processing performed by the control unit 11 and the communication control unit 21 will now be described.

<Bidirectional Communication Processing Performed by Control Unit>

Figure 3:
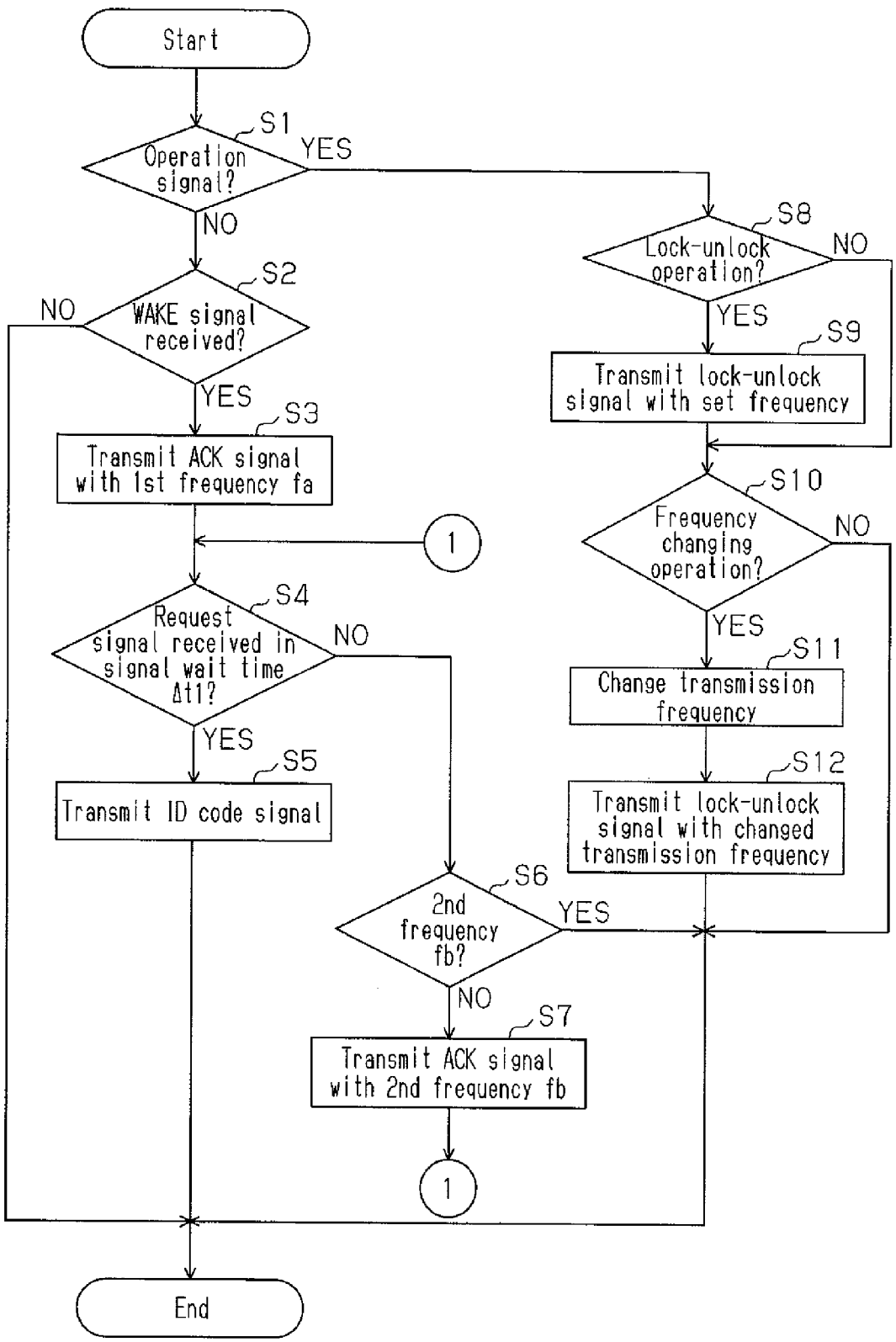
FIG. 3 is a flowchart showing the processing performed by a control unit in the portable device of the first embodiment.

Bidirectional communication processing performed by the control unit 11 of the portable device 10 will now be described with reference to the flowcharts of FIGS. 3 and 16.

Figure 16:
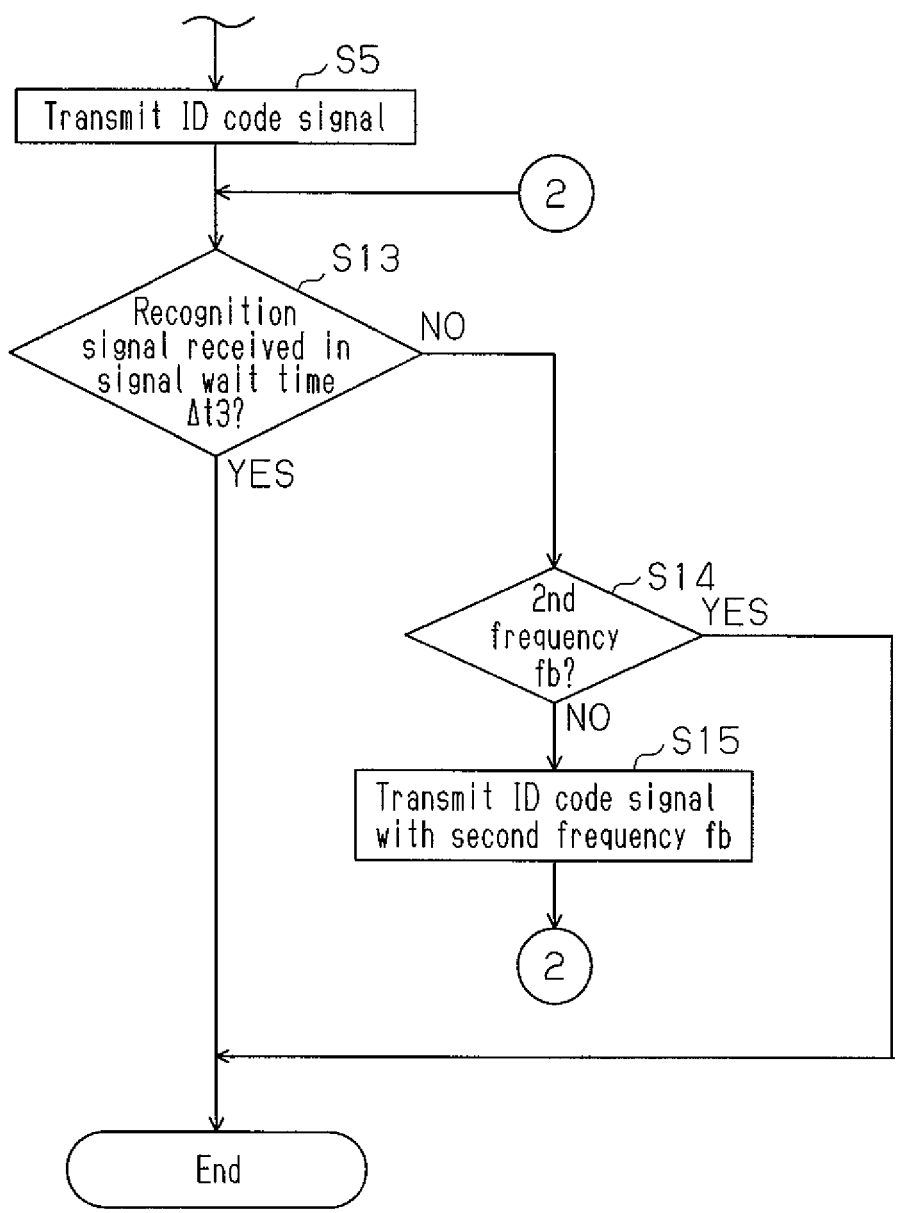
FIG. 16 is a flowchart showing a bidirectional communication process performed by a communication control unit in a fifth embodiment of the present invention.

The control unit 11 sequentially performs steps S1 to S5 of FIG. 2 in the same manner as in the first embodiment and then proceeds to step S13 of FIG. 16. In step S13, the control unit 11 determines whether or not the receiver 12 has received a recognition signal from the communication controller 20 during a recognition signal wait time $\Delta t3$ after transmission of the ID code signal. When a recognition signal has been received, the control unit 11 temporarily ends processing. The communication controller 20 transmits the recognition signal when receiving an ID code signal from the portable device 10.

When the recognition signal is not received during the time $\Delta t3$, in step S14, the control unit 11 determines whether or not the transmission frequency of the transmitted ID code signal is the second frequency fb. If the transmission frequency is not the second frequency fb, that is, if the transmission frequency is the first frequency fa, the control unit 11 proceeds to step S15.

In step S15, the control unit 11 provides the transmitter 13 with an ID code signal together with a frequency control signal for setting the transmission frequency to the second frequency fb. Thus, when the time $\Delta t3$ elapses from the transmission of the ID code signal with the first frequency fa, the transmitter 13 transmits an ID code signal with the second frequency fb. When step S15 is completed, the control unit 11 returns to step S13. That is, after the transmission of the ID code signal with the first frequency fa, if a recognition signal is not received within the time $\Delta t3$, the control unit 11 changes the transmission frequency to the second frequency fb and retransmits the ID code signal (retransmission control).

<Bidirectional Communication Processing Performed by Communication Control Unit 21>

Figure 17:
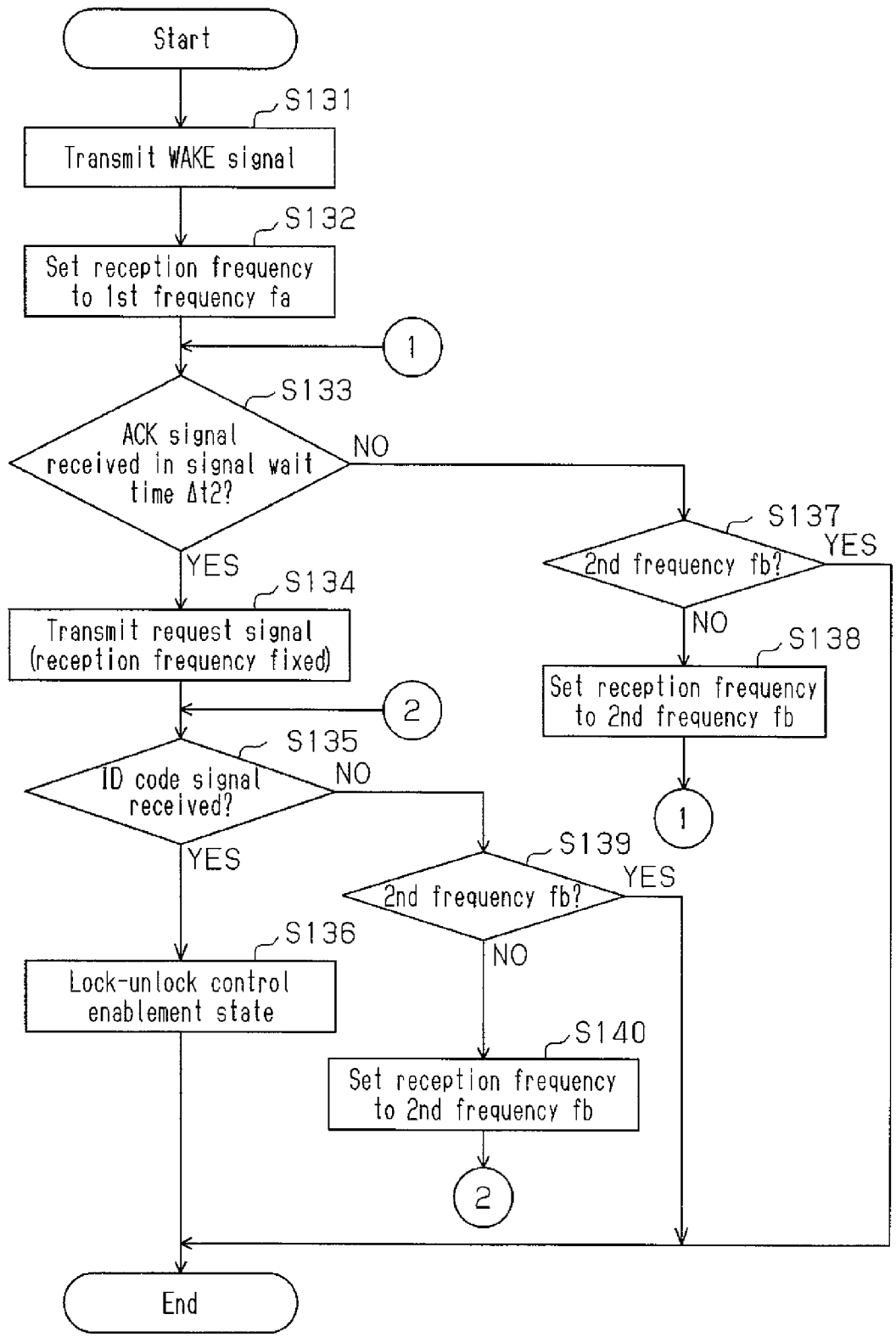
FIG. 17 is a flowchart showing a bidirectional communication process performed by a control unit in a portable device of the fifth embodiment.
Figure 18:
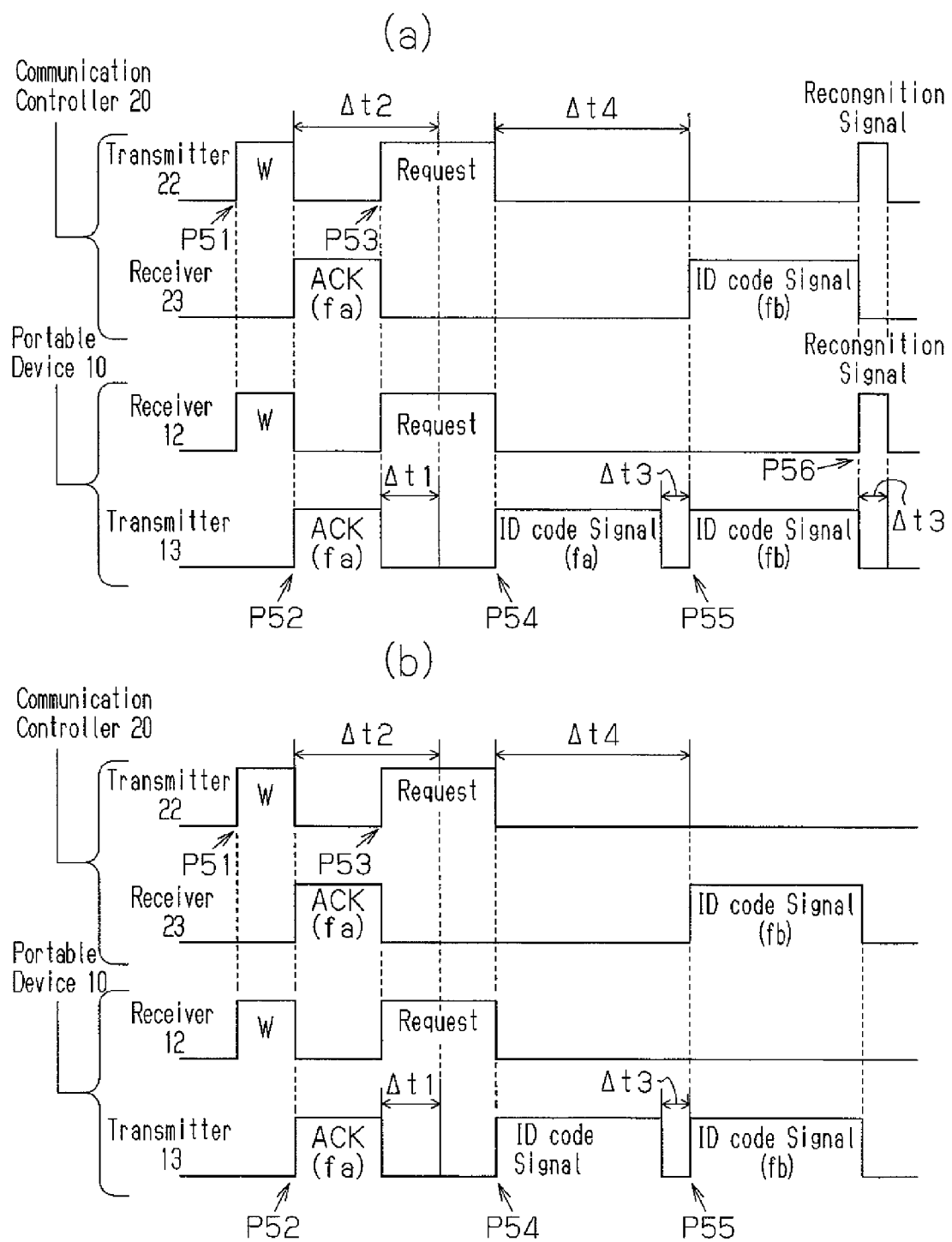
FIG. 18(a) is a time chart showing an example of bidirectional communication in the fifth embodiment.
FIG. 18(b) is a time chart showing an example of bidirectional communication in another embodiment according to the present invention.

Bidirectional communication processing performed by the communication control unit 21 of the communication controller 20 will now be described with reference to the flowchart of FIG. 17.

When shifting from unidirectional communication processing to bidirectional communication processing in the same manner as the first embodiment, in step S131, the communication control unit 21 transmits a WAKE signal from the transmitter 22. Then, the step S132, the communication control unit 21 sets the reception frequency of the receiver 23 to the first frequency fa. Steps S131 and S132 may be performed in a reversed order.

Next, in step S133, the communication control unit 21 determines whether or not the receiver 23 has received an ACK signal from the portable device 10 within the ACK signal wait time $\Delta t2$ after transmission of the WAKE signal. If the receiver 23 has received the ACK signal, in step S134, the communication control unit 21 transmits a request signal from the transmitter 22. Afterwards, the communication control unit 21 enters a signal reception wait state and waits for an ID code signal transmitted from the portable device 10 in response to the request signal. When in the signal reception wait state for the ID code signal, the reception frequency of the receiver 23 is maintained. In the fifth embodiment, the ACK signal wait time $\Delta t2$ is set, for example, to the sum of the time for transmitting the ACK signal from the portable device 10 and the request signal wait time $\Delta t1$. Thus, the changing pattern and changing time of the transmission frequency of the portable device 10 is synchronized with the changing pattern and changing time of the reception frequency of the communication controller 20.

In step S135, the communication control unit 21 determines whether or not the receiver 23 has received an ID code signal from the associated portable device 10 within an ID code signal wait time $\Delta t4$ after transmission of the ID code signal. If an ID code signal has been received during the time $\Delta t4$, the communication control unit 21 proceeds to step S136 enters a lock-unlock control enablement state to enable execution of a control for locking and unlocking a door with the door lock device 24. Then, the communication control unit 21 temporarily ends processing.

If the receiver 23 has not received an ACK signal within the time $\Delta t2$ in step S133, the communication control unit 21 proceeds to step S137 and determines whether or not the present reception frequency of the receiver 23 is the second frequency fb. If the present reception frequency of the receiver 23 is the second frequency fb, the communication control unit 21 temporarily ends processing. If the present reception frequency of the receiver 23 is not the second frequency fb, that is, if the present reception frequency of the receiver 23 is the first frequency fa, the communication control unit 21 proceeds to step S138 and sets the reception frequency of the receiver 23 to the second frequency fb. In other words, if the ACK signal cannot be received within the time $\Delta t2$ after receiving the WAKE signal, the communication control unit 21 executes a reception frequency changing control to change the reception frequency of the receiver 23.

If the receiver 23 has not received an ID code signal within the time Δt4 in step S135, the communication control unit 21 proceeds to step S139 and determines whether or not the present reception frequency of the receiver 23 is the second frequency fb. If the present reception frequency of the receiver 23 is the second frequency fb, the communication control unit 21 temporarily ends processing. If the present reception frequency of the receiver 23 is not the second frequency fb, that is, if the present reception frequency of the receiver 23 is the first frequency fa, the communication control unit 21 proceeds to step S140 and sets the reception frequency of the receiver 23 to the second frequency fb. In other words, if the ID code signal cannot be received within the time Δt4 after receiving the request signal, the communication control unit 21 executes a reception frequency changing control to change the reception frequency of the receiver 23.

The operation of the communication control system 1 will now be discussed with reference to the time charts of FIG. 18(a).

<Example of Communication Establishment when No Disturbance Occurs>

This case is the same as the operation of the first embodiment shown in FIG. 8(a) and will not be described.

<Example of Communication Establishment in when Disturbance Occurs>

This case is the same as the operation of the first embodiment shown in FIG. 8(b) and will not be described.

<Example of Communication Establishment when Disturbance Occurs after Transmission of Request Signal>

Referring to FIG. 18(a), at point P51, the transmitter 22 of the communication controller 20 transmits a WAKE signal, and the receiver 12 of the portable device 10 receives the WAKE signal. Then, at point P52, the transmitter 13 of the portable device 10 transmits an ACK signal from the transmitter 13 with the first frequency fa.

The reception frequency of the receiver 23 in the communication controller 20 is set to the first frequency fa during the ACK signal wait time Δt2 after transmission of the WAKE signal. Accordingly, the ACK signal transmitted from the portable device 10 and having the first frequency fa is receivable by the communication controller 20. When the receiver 23 normally receives the ACK signal, at point P53, the communication controller 20 transmits a request signal from the transmitter 22.

If the request signal is received by the receiver 12 of the portable device 10 during the request signal wait time Δt1 after transmission of the ACK signal, at point P54, the portable device 10 transmits an ID code signal from the transmitter 13 with the first frequency fa. However, if the receiver 23 of the communication controller 20 does not receive the ID code signal having the first frequency fa as shown in the state of FIG. 18(a), the communication controller 20 does not transmit a recognition signal.

In this case, at point P55, the recognition signal wait time Δt3 elapses in a state in which the portable device 10 cannot receive a recognition signal after transmitting the ID code signal with the first frequency fa. Accordingly, the portable device 10 retransmits the ID code signal with the second frequency fb. Further, the ID code signal wait time Δt4 elapses in a state in which the communication controller 20 cannot receive the ID code signal with the first frequency fa after transmitting the request signal. Accordingly, the communication controller 20 changes the reception frequency of the receiver 23 to the second frequency fb. In this state, the transmission frequency of the transmitter 13 in the portable device 10 and the reception frequency of the receiver 23 in the communication controller 20 are changed in a substantially synchronized manner. Thus, the ID code signal transmitted from the portable device 10 with the second frequency fb is receivable by the communication controller 20. When the receiver 23 normally receives the ID code signal having the second frequency fb, at point 56, the communication controller 20 transmits a recognition signal from the transmitter 22.

When the receiver 12 normally receives the recognition signal, the portable device 10 temporarily ends processing.

In addition to advantages (1), (2), and (4) to (7), the vehicle communication control system 1 of the fifth embodiment has the advantage described below.

(12) After transmitting an ID code signal with the first frequency fa, when a recognition signal cannot be received from the communication controller 20 within the time Δt3, the portable device 10 retransmits an ID code signal with another frequency (second frequency fb). Meanwhile, the communication controller 20 changes the reception frequency of the receiver 23 from the first frequency fa to the second frequency fb when time Δt4 elapses after transmission of the request signal. When receiving an ID code signal transmitted from the portable device with the second frequency fb, the communication controller 20 transmits a recognition signal. Thus, even if the communication controller 20 cannot normally receive an ID code signal due to disturbance such as noise, communication between the communication controller 20 and the portable device 10 is established with another frequency.

Accordingly, the communication control system 1 of the fifth embodiment ensures that wireless communication is performed between the portable device 10, which changes the transmission frequency of the ID code signal, and the communication controller 20, which changes the reception frequency of the ID code signal.

It should be apparent to those skilled in the art that the present invention may be embodied in many other specific forms without departing from the spirit or scope of the invention. Particularly, it should be understood that the present invention may be embodied in the following forms.

In the third embodiment, the control unit 11 of the portable device 10 (FIG. 12) may perform the same processing as the control unit 11 of the first embodiment. More specifically, in the third embodiment, after transmitting the ACK signal with the first frequency fa (step S63), if the request signal is received within the request signal wait time Δt1, the control unit 11 may transmit an ID code signal without transmitting the ACK signal with the second frequency fb. In this case, the communication controller 20 does not immediately transmit a request signal if an ACK signal having the first frequency fa is received. That is, the communication controller 20 tries to receive an ACK signal having the second frequency fb during the ACK signal wait time Δt2. Thus, the control unit 11 performs a processing that is equivalent to that of the third embodiment.

The communication control unit 21 in the communication controller of the fourth embodiment (FIG. 14) may, in step S81, select the communication frequency from, for example, only the communication history information. This eliminates the need for the location information acquisition device 71 in the communication control unit 21. Further, the amount of information recorded to the memory 21M of the communication control unit 21 is reduced.

In the fifth embodiment, the receiver 23 of the communication controller 20 may have the same received signal intensity detection function as the receiver 23 of the second embodiment. In this case, the communication control unit 21 of the fifth embodiment also uses an intensity detection signal from the receiver to execute a reception frequency changing control for changing the reception frequency. More specifically, in the same manner as in the second embodiment, the communication control unit 21 of the fifth embodiment determines whether or not a wireless signal (radio wave) has been received from the detected received signal intensity. When the received radio wave Th does not exceed the intensity threshold Th, the communication control unit 21 determines that the portable device 10 is not located in the communication area and thus does not execute the reception frequency changing control. This reduces the power consumption of the communication controller 20.

In the fifth embodiment, as shown in FIG. 18(b), after transmitting the ID code signal with the first frequency fa, the control unit 11 in the portable device 10 (FIG. 16) may always transmit an ID code signal having the second frequency fb when the received signal wait time Δt3 elapses. In this case, the communication controller 20 does not have to transmit a recognition signal. Further, the control unit 11 does not have to determine whether or not there is a recognition signal. Thus, the processing of the control unit 11 does not have to be varied.

In each of the above embodiments, the frequencies for the transmitter 13 of the portable device 10 and the receiver 23 of the communication controller 20 are not limited to the first frequency fa and second frequency fb. In other words, the transmitter 13 of the portable device 10 and the receiver 23 of the communication controller 20 can be changed between three or more frequencies.

When the frequency can be changed between three or more values, based on the communication history information recorded in the memory 21M, the communication control unit 21 in the communication controller 20 of the fourth embodiment may, in step S89, set the reception frequency giving priority to frequencies that establish communication more often. In the same manner, based on the frequency history information recorded in the memory 21M, the control unit 11 of the portable device 10 during unidirectional communication control (FIG. 15) may, in step S104, set the transmission frequency giving priority to frequencies that establish communication more often.

When the frequency can be changed between three or more values, the communication control unit 21 of the communication controller 20 in the fourth embodiment (FIG. 14) may perform a filtering process that limits the selectable frequencies to two or more (for example, two) based on the location information and the communication history information. In this case, for example, the communication control unit 21 preferably sets a priority order to the filtered frequencies and generates a WAKE signal that includes frequency data indicating the filtered frequencies and the priority order. When receiving the WAKE signal, the control unit 11 of the portable device 10 selects one of the filtered frequencies in accordance with the priority order based on the frequency data.

Figure 19:
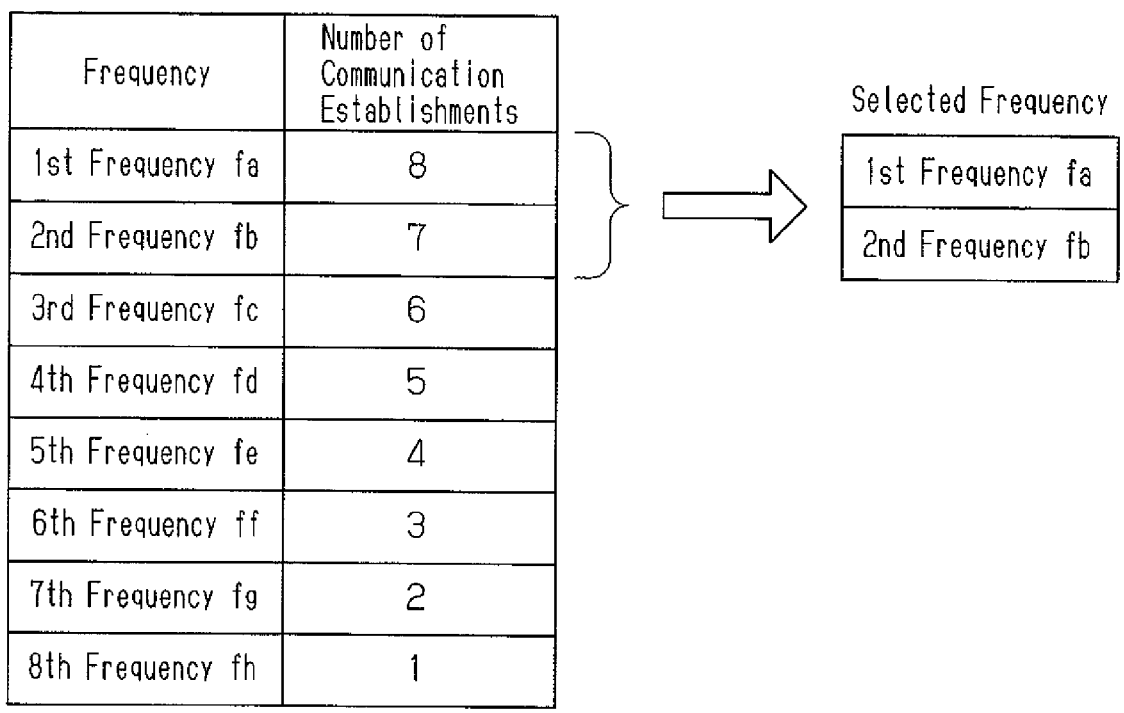
FIG. 19 is a chart showing an example of frequency selection in a further embodiment according to the present invention.

For example, as shown in FIG. 19, eight frequencies (first frequency fa to eighth frequency fh) are set as the changeable frequencies. The memory 21M of the communication control unit 21 records the number of times communication has been established for each of the frequencies fa to fh as follows: "fa=8", "fb=7", "fc=6", "fd=5", "fe=4", "ff=3", "fg=2", and "fh=1". In this case, the communication control unit 21 selects two of the frequencies fa to fh that have established communication most often (i.e., first frequency fa and second frequency fb). The communication control unit 21 gives priority to the first frequency fa and the second frequency fb and transmits a WAKE signal including frequency data.

The control unit 11 of the portable device 10 filters the frequencies fa to fh based on the frequency data included in the received WAKE signal and sets the transmission frequency to either one of the first frequency fa and the second frequency fb.

In this manner, the communication control unit 21 limits the frequencies to those that establish communication with a high probability based on the past communication history. Accordingly, the optimal communication frequency is selected in accordance with the actual communication conditions. This shortens the frequency selection time. Further, the optimal communication frequency is efficiently selected.

Particularly, when frequency selection processing is performed during bidirectional communication processing as in the communication controller 20 of the third embodiment, the portable device 10 does not have to transmit the ACK signal with all of the changeable frequencies. Accordingly, the time for transmission of the ACK signal from the portable device 10 and the time for communication between the portable device 10 and the communication controller 20 may be shortened. Further, the power consumption of the portable device 10 may be reduced. In addition, frequencies having a high communication establishment probability are selected. This facilitates communication with the selected frequency. Thus, communication errors are suppressed while increasing the communication responsiveness between the portable device 10 and the communication controller 20.

The number of frequencies limited during the selection processing may be three or more. Further, if communication with the portable device 10 cannot be established by the selected frequency, the communication control unit 21 can select another frequency that has not been selected. In this case, the communication control unit 21 selects frequencies from those that have established communication more often.

In each of the above embodiments, during unidirectional communication processing, the transmission frequency of the transmitter 13 in the portable device 10 and the reception frequency of the receiver 23 in the communication controller 20 may be fixed.

In each of the above embodiments, the application of the communication control system 1 is not limited to a lock-unlock system for a vehicle door. For example, the communication control system 1 is applicable to a system that executes control for enabling engine starting and a control for setting and canceling a security control system. Further, the application of the communication control system 1 is not limited to the vehicle 2. The communication control system 1 may also be applied to a control the locking and unlocking of a door for a building, such as a house, or to set and cancel a building security system. Further, the application of the communication control system 1 is not limited to security control. The communication control system 1 may be applied to any system performing wireless communication between a portable device 10 and a communication controller 20.

The present examples and embodiments are to be considered as illustrative and not restrictive, and the invention is not to be limited to the details given herein, but may be modified within the scope and equivalence of the appended claims.

What is claimed is:

1. A portable device for performing wireless communication with a communication controller to receive a first request signal from the communication controller, the portable device comprising:

a transmitter which transmits a first response signal with a selected one of a plurality of transmission radio frequencies that corresponds to the first request signal in response thereto; and a transmission control unit which controls a transmission radio frequency of the transmitter and transmits the first response signal from the transmitter with one of the plurality of transmission radio frequencies, with the portable device being able to receive a second request signal from the communication controller that receives the first response signal;

wherein when the portable device does not receive the second request signal, the transmission control unit retransmits the first response signal from the transmitter with another one of the plurality of transmission radio frequencies without waiting for retransmission of the first request signal from the communication controller.

2. The portable device according to claim 1, wherein when the portable device receives the second request signal, the transmission control unit transmits a second response signal from the transmitter with a transmission radio frequency that is the same as the transmission radio frequency of the first response signal.

3. The portable device according to claim 1, wherein when the first request signal includes radio frequency data, the transmission control unit transmits the first response signal from the transmitter with a transmission radio frequency indicated by the radio frequency data.

4. The portable device according to claim 1, wherein:
the second request signal includes radio frequency data; and
when the portable device receives the second request signal, the transmission control unit transmits a second response signal from the transmitter with a transmission radio frequency indicated by the radio frequency data.

5. A portable device for performing wireless communication with a communication controller to receive a first request signal from the communication controller, the portable device comprising:
a transmitter which transmits a first response signal with a selected one of a plurality of transmission radio frequencies that corresponds to the first request signal in response thereto; and
a transmission control unit which controls a transmission radio frequency of the transmitter and sequentially transmits a plurality of first response signals, having different transmission radio frequencies and corresponding to the first request signal, from the transmitter to the communication controller without waiting for retransmission of the first request signal from the communication controller, with the communication controller transmitting to the portable device a second request signal including radio frequency data based on the plurality of first response signals;
wherein the transmission control unit transmits a second response signal from the transmitter with a transmission radio frequency indicated by the radio frequency data in response to the second request signal.

6. A communication controller for performing wireless communication with a portable device for receiving a first response signal therefrom, the communication controller comprising:
a transmitter which transmits a first request signal to the portable device, in which the portable device responds thereto with the first response signal corresponding to the first request signal;

a receiver which is able to receive a wireless signal with a selected one of a plurality of reception radio frequencies, with the wireless signal including the first response signal; and a communication control unit which controls transmission of the first request signal, reception of the first response signal, and a reception radio frequency of the receiver;

wherein after transmitting the first request signal, based on a predetermined signal wait time, the communication control unit selectively executes a radio frequency changing control for changing the reception radio frequency of the receiver without performing retransmission of the first request signal and a second request signal transmission control for transmitting a second request signal to the portable device in response to the first response signal.

7. The communication controller according to claim 6, wherein:
the communication control unit when transmitting the first request signal enters a first wait state to wait for reception of the first response signal and when transmitting the second request signal in response to the first response signal in the first wait state enters a second wait state to wait for reception of a second response signal transmitted from the portable device; and
the communication control unit sets, in the second wait state, the reception radio frequency of the receiver at a radio frequency that is the same as the first response signal.

8. The communication controller according to claim 6, wherein when the receiver receives the first response signal, the communication control unit ends the radio frequency changing control and executes the second request signal transmission control.

9. The communication controller according to claim 6, wherein:
the communication control unit when transmitting the first request signal enters a first wait state to wait for reception of the first response signal and when transmitting the second request signal in response to the first response signal in the first wait state enters a second wait state to wait for reception of a second response signal transmitted from the portable device; and
when the receiver does not receive the second response signal in the second wait state, the communication control unit executes a second radio frequency changing control to change the reception radio frequency of the receiver to a radio frequency that differs from that of the first response signal.

10. The communication controller according to claim 6, wherein:
the receiver has a received signal intensity detection function for detecting reception intensity of the wireless signal; and
the communication control unit determines reception of the wireless signal based on the reception intensity, retransmits the first request signal without executing the radio frequency changing control when the wireless signal is not received, and executes the radio frequency changing control when the wireless signal is received but is not the first response signal.

11. The communication controller according to claim 6, further comprising:
a memory for recording the radio frequency of the first response signal when communication is satisfied between the portable device and the communication controller as communication history information;

wherein the communication control unit determines a priority order of the radio frequency of the first response signal and the reception radio frequency of the receiver based on the communication history information, includes in the first request signal radio frequency data indicating the priority order, and changes the reception radio frequency of the receiver in accordance with the priority order when executing the radio frequency changing control.

12. The communication controller according to claim 11, wherein:
the communication history information is associated with location information of the communication controller when communication is established between the portable device and the communication controller; and
the communication control unit determines the priority order based on the communication history information and the location information.

13. A communication controller for performing wireless communication with a portable device and receiving a first response signal therefrom, the communication controller comprising:
a transmitter which transmits a first request signal to the portable device, in which the portable device responds thereto with the first response signal corresponding to the first request signal;
a receiver which is able to receive a wireless signal with a selected one of a plurality of reception radio frequencies, with the wireless signal including the first response signal; and
a communication control unit which controls transmission of the first request signal, reception of the first response signal, and a reception radio frequency of the receiver, with the communication control unit being configured to sequentially receive a plurality of first response signals corresponding to the first request signal with different reception radio frequencies without performing retransmission of the first request signal and transmit a second request signal to the portable device;
wherein the communication control unit compares the reception radio frequencies of the plurality of first response signals to select an optimal radio frequency, and the communication control unit includes radio frequency data indicating the selected optimal radio frequency in the second request signal to receive a second response signal corresponding to the second request signal with the selected optimal radio frequency.

14. A communication control system comprising:
a communication controller which transmits a first request signal and a portable device which performs wireless communication with the communication controller and transmits a first response signal that corresponds to the first request signal;
a transmitter included in the portable device to transmit the first response signal with a selected one of a plurality of transmission radio frequencies;
a transmission control unit included in the portable device to control a transmission radio frequency of the transmitter and transmit the first response signal from the transmitter with the one of a plurality of transmission radio frequencies, with the portable device being able to receive a second request signal from the communication controller that receives the first response signal, wherein when the portable device does not receive the second request signal, the transmission control unit retransmits the first response signal from the transmitter with a transmission radio frequency that differs from the one of a plurality of transmission radio frequencies;
a receiver included in the communication controller and being able to receive a wireless signal with the selected one of a plurality of transmission radio frequencies, the wireless signal including the first response signal; and
a communication control unit included in the communication control unit to control transmission of the first request signal, reception of the first response signal, and a reception radio frequency of the receiver, wherein after transmitting the first request signal, based on a predetermined signal wait time, the communication control unit selectively executes a radio frequency changing control for changing the reception radio frequency of the receiver and a second request signal transmission control for transmitting the second request signal to the portable device in response to the first response signal;
wherein the transmission radio frequency of the transmitter in the portable device and the reception radio frequency of the receiver in the communication controller are synchronously changed to the same radio frequency.

* * * * *